(12) United States Patent
Yuan et al.

(10) Patent No.: US 12,370,919 B2
(45) Date of Patent: Jul. 29, 2025

(54) SMART BATTERY SWAPPING STATION COMPATIBLE WITH MULTIPLE BATTERY PACKS, CONTROL METHOD THEREOF, DEVICE, AND MEDIUM

(71) Applicants: STATE GRID JIANGSU ELECTRIC POWER COMPANY RESEARCH INSTITUTE, Nanjing (CN); NARI TECHNOLOGY CO., LTD., Nanjing (CN); NIO CO., LTD., Shanghai (CN); STATE GRID JIANGSU ELECTRIC POWER CO., LTD., Nanjing (CN)

(72) Inventors: Xiaodong Yuan, Nanjing (CN); Haiqing Gan, Nanjing (CN); Huachun Han, Nanjing (CN); Jin Man, Nanjing (CN); Qun Li, Nanjing (CN); Yu Liu, Nanjing (CN); Mingshen Wang, Nanjing (CN); Liangliang Chen, Nanjing (CN); Ning Zhang, Nanjing (CN); Lihui Wang, Nanjing (CN); Wenjun Ruan, Nanjing (CN); Huiyu Miao, Nanjing (CN); Yi Pan, Nanjing (CN); Fengkun Yang, Nanjing (CN); Fei Zeng, Nanjing (CN); Shukang Lv, Nanjing (CN); Sheng Dou, Nanjing (CN)

(73) Assignees: STATE GRID JIANGSU ELECTRIC POWER COMPANY RESEARCH INSTITUTE, Nanjing (CN); NARI TECHNOLOGY CO., LTD., Nanjing (CN); NIO CO., LTD., Shanghai (CN); STATE GRID JIANGSU ELECTRIC POWER CO., LTD., Nanjing (CN)

( * ) Notice: Subject to any disclaimer, the term of this patent is extended or adjusted under 35 U.S.C. 154(b) by 0 days.

(21) Appl. No.: 19/060,553

(22) Filed: Feb. 21, 2025

(65) Prior Publication Data
US 2025/0206181 A1 Jun. 26, 2025

Related U.S. Application Data

(63) Continuation of application No. PCT/CN2024/123380, filed on Oct. 8, 2024.

(51) Int. Cl.
*B60L 53/80* (2019.01)
*B60L 53/62* (2019.01)
(Continued)

(52) U.S. Cl.
CPC .............. *B60L 53/80* (2019.02); *B60L 53/62* (2019.02); *B60L 53/64* (2019.02); *B60L 53/65* (2019.02);
(Continued)

(58) Field of Classification Search
CPC .......... B60L 53/80; B60L 53/62; B60L 53/64; B60L 53/65; G06T 7/13; G06T 7/75;
(Continued)

(56) References Cited

U.S. PATENT DOCUMENTS

| 5,545,967 A | 8/1996 | Osborne et al. |
| 2020/0317081 A1* | 10/2020 | Chen ................ B60L 53/80 |
| 2024/0100987 A1* | 3/2024 | Lu ..................... B60L 53/80 |

FOREIGN PATENT DOCUMENTS

| CN | 106882163 A | 6/2017 |
| CN | 207208025 U | 4/2018 |

(Continued)

*Primary Examiner* — David V Henze-Gongola
(74) *Attorney, Agent, or Firm* — SZDC Law PC

(57) ABSTRACT

The invention relates to the technical field of battery swapping for electric vehicles. A control method of a smart battery swapping station includes: acquiring vehicle information of a vehicle requiring battery swapping, and retrieving a model type of a corresponding battery pack locking (Continued)

and unlocking hole and specific parameters from a database; when the vehicle arrives at a battery swapping operation platform, capturing an image of a vehicle chassis to determine an initial pose of the vehicle chassis; processing the initial pose to extract center coordinates of the locking and unlocking hole and a normal vector direction of the locking and unlocking hole; comparing the center coordinates of the locking and unlocking hole and the normal vector direction of the locking and unlocking hole with the retrieved model type of battery pack locking and unlocking hole and specific parameters in the database to determine if the information is consistent.

13 Claims, 5 Drawing Sheets

(51) Int. Cl.
*B60L 53/64* (2019.01)
*B60L 53/65* (2019.01)
*G06T 7/13* (2017.01)
*G06T 7/73* (2017.01)
*G06V 10/48* (2022.01)
*G06V 10/77* (2022.01)
*G06V 10/82* (2022.01)
*G06V 20/58* (2022.01)

(52) U.S. Cl.
CPC ............... *G06T 7/13* (2017.01); *G06T 7/75* (2017.01); *G06V 10/48* (2022.01); *G06V 10/7715* (2022.01); *G06V 10/82* (2022.01); *G06V 20/58* (2022.01); *G06T 2207/10024* (2013.01); *G06T 2207/20024* (2013.01); *G06T 2207/20061* (2013.01); *G06T 2207/30252* (2013.01); *G06V 2201/06* (2022.01)

(58) Field of Classification Search
CPC .... G06V 10/48; G06V 10/7715; G06V 10/82; G06V 20/58; B60S 5/06
See application file for complete search history.

(56) References Cited

FOREIGN PATENT DOCUMENTS

| CN | 111823939 A | 10/2020 |
|---|---|---|
| CN | 115272655 A | 11/2022 |
| CN | 219506133 U | 8/2023 |
| WO | 2024055710 A1 | 3/2024 |

* cited by examiner

```
┌─────────────────────────────────────────────────────────────────────┐
│ Acquiring vehicle information of a vehicle requiring battery        │
│ swapping, and retrieving a model type of a corresponding battery    │
│ pack locking and unlocking hole and specific parameters from        │
│ a database;                                                         │
└─────────────────────────────────────────────────────────────────────┘
                                  ▽
┌─────────────────────────────────────────────────────────────────────┐
│ When the vehicle arrives at a battery swapping operation platform,  │
│ capturing an image of a vehicle chassis to determine an initial     │
│ pose of the vehicle chassis;                                        │
└─────────────────────────────────────────────────────────────────────┘
                                  ▽
┌─────────────────────────────────────────────────────────────────────┐
│ Processing the initial pose to extract center coordinates of the    │
│ locking and unlocking hole and a normal vector direction of the     │
│ locking and unlocking hole;                                         │
└─────────────────────────────────────────────────────────────────────┘
                                  ▽
┌─────────────────────────────────────────────────────────────────────┐
│ Comparing the center coordinates of the locking and unlocking hole  │
│ and the normal vector direction of the locking and unlocking hole   │
│ with the retrieved model type of battery pack locking and unlocking │
│ hole and specific parameters in the database to determine if the    │
│ information is consistent;                                          │
└─────────────────────────────────────────────────────────────────────┘
                                  ▽
┌─────────────────────────────────────────────────────────────────────┐
│ If inconsistent, prompting a user to leave the battery swapping     │
│ operation platform; if consistent, selecting, by a battery swapping │
│ automated guided vehicle (AGV), a corresponding locking and         │
│ unlocking operation method, and retrieving a battery from a storage │
│ for battery replacement; and                                        │
└─────────────────────────────────────────────────────────────────────┘
                                  ▽
┌─────────────────────────────────────────────────────────────────────┐
│ Once the battery swapping is complete, generating a battery         │
│ swapping report and allowing the user to leave.                     │
└─────────────────────────────────────────────────────────────────────┘
```

*FIG. 1*

SMART BATTERY SWAPPING STATION COMPATIBLE WITH MULTIPLE BATTERY PACKS, CONTROL METHOD THEREOF, DEVICE, AND MEDIUM

This application is a Continuation Application of PCT/CN2024/123380, filed on Oct. 8, 2024, which claims priority to Chinese Patent Application No. 202411325633.X, filed on Sep. 23, 2024, which is incorporated by reference for all purposes as if fully set forth herein.

TECHNICAL FIELD

The invention relates to the technical field of battery swapping for electric vehicles, in particular to a smart battery swapping station compatible with multiple battery packs, a control method thereof, a device, and a medium.

BACKGROUND OF THE INVENTION

In recent years, as global attention to environmental protection and sustainable development has increased, the promotion of new energy vehicles (NEVs), especially electric vehicles (EVs), has received strong government support. The growth in policy support and market demand has facilitated the development of charging and battery swapping infrastructure, including a demand for efficient and highly compatible battery swapping technologies. However, current battery swapping station technologies lack compatibility, particularly in supporting different brands, models, and battery pack types. Battery swapping stations often serve only specific vehicles and battery types, limiting their universality and user base.

The locking mechanisms for battery packs are diverse, including latch, bolt, and spinning types, complicating battery swapping operations. Different locking mechanisms require specific locking and unlocking methods, and existing battery swapping technologies often struggle to handle this diversity.

The information disclosed in Background Art is only intended to facilitate the understanding of the general background of the invention, and should not be taken as an acknowledgement or any form of implication that this information constitutes the prior art known to those of ordinary skill in the art.

SUMMARY OF THE INVENTION

The invention provides a smart battery swapping station compatible with multiple battery packs, a control method thereof, a device, and a medium, effectively addressing the issues in the background art.

To achieve the above objective, the invention adopts the following technical scheme. A control method of a smart battery swapping station compatible with multiple battery packs comprises the following steps:

acquiring vehicle information of a vehicle requiring battery swapping, and retrieving a model type of a corresponding battery pack locking and unlocking hole and specific parameters from a database;

when the vehicle arrives at a battery swapping operation platform, capturing an image of a vehicle chassis to determine an initial pose of the vehicle chassis;

processing the initial pose to extract center coordinates of the locking and unlocking hole and a normal vector direction of the locking and unlocking hole;

comparing the center coordinates of the locking and unlocking hole and the normal vector direction of the locking and unlocking hole with the retrieved model type of battery pack locking and unlocking hole and specific parameters in the database to determine if the information is consistent;

if inconsistent, prompting a user to leave the battery swapping operation platform; if consistent, selecting, by a battery swapping automated guided vehicle (AGV), a corresponding locking and unlocking operation method, and retrieving a battery from a storage for battery replacement; and once the battery swapping is complete, generating a battery swapping report and allowing the user to leave.

Further, acquiring vehicle information of a vehicle requiring battery swapping comprises:

setting up a camera at an entrance of the battery swapping station to capture images of vehicles entering the battery swapping station;

performing size adjustment and color space conversion on the images;

using the Canny edge detection algorithm to extract vehicle contours, employing the Hough transform method to detect geometric shapes within the vehicle contours, and acquiring point cloud data of the vehicle;

utilizing the Euclidean clustering algorithm to group different objects in the point cloud data, extracting key feature points of the vehicle contours from the clustered point cloud, and merging image features with point cloud features to form a complete feature vector; and loading a pre-trained deep learning model, inputting the feature vector into the deep learning model, and outputting a classification result of the vehicle.

Further, capturing an image of a vehicle chassis to determine an initial pose of the vehicle chassis comprises:

capturing a raw image of the vehicle chassis using a visual sensor, and cropping and resizing the captured raw image to a specified dimension;

utilizing a deep learning model for feature extraction, the deep learning model downsampling the input image, predicting a position of a center of a target bounding box and an offset thereof, and generating a feature map;

based on the feature map, predicting the position of the center of the target bounding box, the offset thereof, as well as the width and height of the target bounding box;

acquiring intrinsic and extrinsic parameters of a camera, converting predicted keypoint positions in the feature map to spatial coordinates of the raw image through warpAffine transformation, and generating point cloud data of the vehicle chassis based on a three-dimensional space reconstruction result;

applying voxel filtering to the point cloud data to remove noise points;

performing Euclidean clustering on the filtered point cloud, and using principal component analysis (PCA) to analyze the point cloud data to identify a primary direction of the point cloud data and estimate an approximate orientation of the vehicle chassis;

using the random sample consensus (RANSAC) algorithm to fit the point cloud data to exclude outliers, and obtaining a planar model of the vehicle chassis; and determining the initial pose of the vehicle chassis based on PCA analysis and RANSAC fitting results.

Further, processing the initial pose to extract center coordinates of the locking and unlocking hole and a normal vector direction of the locking and unlocking hole comprises:

performing denoising and contrast enhancement preprocessing on the initial pose, and converting an original RGB image to an HSV (hue, saturation, value) color space;

setting thresholds in the HSV color space for segmentation, and using the Canny edge detection algorithm to identify edges in the image;

applying morphological opening and closing operations to remove small interference spots or connect broken edges, using the Hough circle transform to detect circular contours in the image, and initially locating the locking and unlocking hole;

setting detection parameters to obtain the center coordinates and radius of each detected circle, and fitting a planar model using the least squares method for each initially located locking and unlocking hole;

selecting a region around a center of the initially located locking and unlocking hole as the region of interest (ROI) within the planar model, using the least squares method to fit a plane equation of a point set within the region, and adjusting a position of the center based on a plane fitting result;

extracting a normal vector from the plane equation obtained from the least squares plane fitting, and confirming whether the normal vector direction correctly points toward an opening direction of the locking and unlocking hole; and outputting the finally determined center coordinates and normal vector direction of the locking and unlocking hole.

Further, selecting, by a battery swapping AGV, a corresponding locking and unlocking operation method, and retrieving a battery from a storage for battery replacement comprises:

implementing space relocation design to allow the battery swapping AGV to switch between different locking and unlocking methods;

utilizing a height switching mechanism to automatically adjust the height of a locking and unlocking mechanism based on height differences of battery packs for different vehicle models; and during the locking and unlocking process, making fine adjustments through adaptive floating based on changes in the position of the battery pack.

Further, selecting, by a battery swapping AGV, a corresponding locking and unlocking operation method, and retrieving a battery from a storage for battery replacement further comprises:

performing battery replacement through a dual AGV coordinated control method, specifically comprising:

connecting independently controlled battery swapping AGVs within the battery swapping station via a communication protocol;

performing time synchronization on the battery swapping AGVs: using the network time protocol (NTP) to ensure consistent timestamps across all AGVs and station control systems;

performing task planning based on task requirements, the current status of the AGVs, the order of vehicle arrivals, and the type of battery pack, and dynamically assigning tasks to each AGV; and utilizing a scheduling algorithm to designate one AGV for disassembly and another AGV for assembly for the vehicle requiring battery swapping.

Further, performing battery replacement through a dual AGV coordinated control method further comprises:

autonomous fault monitoring and fault-tolerant control: when one AGV fails, the other AGV switches to a standalone mode to continue the battery swapping task and sends fault information.

Further, performing battery replacement through a dual AGV coordinated control method further comprises:

using a Leader-Follower strategy to allow the two AGVs to maintain spacing and angular deviation within a set range, using a distance sensor and an angle sensor to monitor and adjust the spacing in real time and continuously detect the relative distance between the two AGVs, and employing a spacing control algorithm to ensure that the two AGVs maintain a safe distance while traveling on a single track.

Further, the control method further comprises an ordered battery pack charging control method, comprising the following steps:

ordered charging strategy: based on the improved cuckoo search algorithm (CSA), exploring the solution space by considering the state of charge (SOC) of a battery, the health status of a battery, and the scheduled usage time of a vehicle by means of random walks and optimal solution selection, so as to automatically prioritize battery charging;

load prediction and smoothing strategy: continuously collecting real-time data of each battery in the battery swapping station, utilizing a combined prediction model based on a freshness function derived from historical data and cross-entropy, receiving real-time load data of a power grid, and pre-planning the allocation of charging power in conjunction with the load prediction; and optimal battery pack scheduling strategy: based on the First-In-First-Out (FIFO) principle, ensuring that the batteries arriving in a warehouse first are the first to be utilized.

Further, the ordered charging strategy further comprises:

monitoring grid conditions and charging progress in real time, and when abnormal increases in grid load are detected, adjusting a charging plan by reducing charging power until the grid load returns to normal; and receiving real-time electricity price information from the power grid, increasing the charging power when low electricity prices are detected, and reducing or stopping charging during peak price periods.

Further, the load prediction and smoothing strategy further comprises:

utilizing a combined prediction model based on a freshness function derived from historical data and cross-entropy to analyze the impact of past charging patterns, weather conditions, and holiday effects on charging demands;

using grey relational analysis to identify historical days with similar meteorological conditions and day types to a target prediction day as the benchmark for prediction, and dynamically adjusting the weights of a single prediction model based on the cross-entropy algorithm;

integrating results from prediction methods such as time series analysis and machine learning models to form a final prediction; and employing the particle swarm algorithm to calculate a charging plan for the next day.

Further, the optimal battery pack scheduling strategy further comprises:

collecting key parameters such as battery voltage, current, temperature, and SOC in real time to assess the health status of the battery;

utilizing big data analysis and machine learning techniques to predict trends in battery lifespan;

setting thresholds for battery health status, and if the monitored battery status falls below the thresholds, immediately removing the battery from the battery swapping service for inspection or repair; and maintaining a reserve of fully charged backup batteries above a specified quantity, and ensuring balanced usage of all batteries to prevent any single battery from being overcharged or excessively discharged.

The invention further provides a smart battery swapping station compatible with multiple battery packs, comprising:

a station control system, smart battery swapping equipment, and a smart battery management warehouse, all communicatively connected; wherein the smart battery swapping equipment comprises a plurality of AGVs equipped with a plurality of locking and unlocking modules corresponding to different vehicle types and battery pack locking mechanisms;

the smart battery management warehouse stores a plurality of batteries and charges the same; and the station control system is used for acquiring vehicle information of a vehicle requiring battery swapping, and retrieving a model type of a corresponding battery pack locking and unlocking hole and specific parameters from a database; when the vehicle arrives at a battery swapping operation platform, capturing an image of a vehicle chassis to determine an initial pose of the vehicle chassis; processing the initial pose to extract center coordinates of the locking and unlocking hole and a normal vector direction of the locking and unlocking hole; comparing the center coordinates of the locking and unlocking hole and the normal vector direction of the locking and unlocking hole with the retrieved model type of battery pack locking and unlocking hole and specific parameters in the database to determine if the information is consistent; if inconsistent, prompting a user to leave the battery swapping operation platform;

if consistent, controlling, by the smart battery swapping equipment, the battery swapping AGVs to select a corresponding locking and unlocking operation method, and retrieving a battery from the smart battery management warehouse for battery replacement; and once the battery swapping is complete, generating a battery swapping report and allowing the user to leave.

Further, the station control system comprises:

a technical architecture which allows the station control system to communicate in real time with the smart battery swapping equipment, the smart battery management warehouse, and other equipment and systems within the battery swapping station, perceives the entire process of battery swapping and monitors the environmental information within the battery swapping station, providing battery swapping monitoring data to a battery swapping station operation system and government management platforms;

a network architecture which employs the TCP/IP network protocol to support the access and acquisition of diverse devices, the station control system using MySQL for data storage and processing and being equipped with SQL query algorithms; and a business architecture which ensures the smooth flow of automated battery swapping through battery swapping monitoring, maintains the stability of the environment and facilities within the station with auxiliary equipment monitoring, prevents and responds to potential risks through safety management, provides decision-making support through operational analysis, coordinates equipment and user data through system management, and facilitates seamless integration with external platforms through service management.

Further, the smart battery swapping equipment further comprises:

a flexible battery swapping operation platform designed to automatically adjust vehicle positions, provide a designated operational area for electric vehicle parking, accommodate various types of vehicles with different track widths and wheelbases, and automatically locate the vehicles.

Further, the AGV also comprises Mecanum wheels, a servo motor, a vision system, laser radar, and a sensor; and the smart battery swapping station further comprises:

a space relocation mechanism which allows the AGV to switch between different locking and unlocking methods;

a height switching mechanism which automatically adjusts the height of a locking and unlocking mechanism based on height differences of battery packs for different vehicle models; and an adaptive floating mechanism which, during the locking and unlocking process, makes fine adjustments through adaptive floating based on changes in the position of the battery pack.

Further, the smart battery management warehouse comprises:

a dynamic charging scheduling unit which employs machine learning algorithms to predict battery demands and grid loads and dynamically adjust a charging plan;

a battery life optimization unit which selects the most suitable charging rate based on the battery type and current status, preventing overcharging or excessive discharging to extend battery life, and formulates a regular maintenance plan based on data analysis to ensure the long-term health of the battery packs; and a flexible storage and scheduling unit which works in conjunction with the battery swapping AGVs to enable automated storage and retrieval of the battery packs, and automatically allocates the battery packs to charging stations or storage areas based on the battery status and charging demands.

Further, the smart battery management warehouse further comprises:

an ordered charging unit which, based on the improved CSA, explores the solution space by considering the SOC of a battery, the health status of a battery, and the scheduled usage time of a vehicle by means of random walks and optimal solution selection, so as to automatically prioritize battery charging;

a load prediction and smoothing unit which continuously collects real-time data of each battery in the battery swapping station, utilizes a combined prediction model based on a freshness function derived from historical data and cross-entropy, receives real-time load data of a power grid, and pre-plans the allocation of charging power in conjunction with the load prediction; and an optimal battery pack scheduling unit which, based on the FIFO principle, ensures that the batteries arriving in a warehouse first are the first to be utilized.

Further, the ordered charging unit is further used for:

monitoring grid conditions and charging progress in real time, and when abnormal increases in grid load are detected, adjusting a charging plan by reducing charging power until the grid load returns to normal; and receiving real-time electricity price information from the power grid, increasing the charging power when low electricity prices are detected, and reducing or stopping charging during peak price periods.

Further, the load prediction and smoothing unit is further used for:

utilizing a combined prediction model based on a freshness function derived from historical data and cross-entropy to analyze the impact of past charging patterns, weather conditions, and holiday effects on charging demands;

using grey relational analysis to identify historical days with similar meteorological conditions and day types to a target prediction day as the benchmark for prediction, and dynamically adjusting the weights of a single prediction model based on the cross-entropy algorithm;

integrating results from prediction methods such as time series analysis and machine learning models to form a final prediction; and employing the particle swarm algorithm to calculate a charging plan for the next day.

Further, the optimal battery pack scheduling unit is further used for:

collecting key parameters such as battery voltage, current, temperature, and SOC in real time to assess the health status of the battery;

utilizing big data analysis and machine learning techniques to predict trends in battery lifespan;

setting thresholds for battery health status, and if the monitored battery status falls below the thresholds, immediately removing the battery from the battery swapping service for inspection or repair; and maintaining a reserve of fully charged backup batteries above a specified quantity, and ensuring balanced usage of all batteries to prevent any single battery from being overcharged or excessively discharged.

Further, the station control system further comprises a vehicle information identification unit which is used for:

setting up a camera at an entrance of the battery swapping station to capture images of vehicles entering the battery swapping station;

performing size adjustment and color space conversion on the images;

using the Canny edge detection algorithm to extract vehicle contours, employing the Hough transform method to detect geometric shapes within the vehicle contours, and acquiring point cloud data of the vehicle;

utilizing the Euclidean clustering algorithm to group different objects in the point cloud data, extracting key feature points of the vehicle contours from the clustered point cloud, and merging image features with point cloud features to form a complete feature vector; and loading a pre-trained deep learning model, inputting the feature vector into the deep learning model, and outputting a classification result of the vehicle.

Further, the station control system further comprises an initial pose identification unit which is used for:

capturing a raw image of the vehicle chassis using a visual sensor, and cropping and resizing the captured raw image to a specified dimension;

utilizing a deep learning model for feature extraction, the deep learning model downsampling the input image, predicting a position of a center of a target bounding box and an offset thereof, and generating a feature map;

based on the feature map, predicting the position of the center of the target bounding box, the offset thereof, as well as the width and height of the target bounding box;

acquiring intrinsic and extrinsic parameters of a camera, converting predicted keypoint positions in the feature map to spatial coordinates of the raw image through warpAffine transformation, and generating point cloud data of the vehicle chassis based on a three-dimensional space reconstruction result;

applying voxel filtering to the point cloud data to remove noise points;

performing Euclidean clustering on the filtered point cloud, and using PCA to analyze the point cloud data to identify a primary direction of the point cloud data and estimate an approximate orientation of the vehicle chassis;

using the random sample consensus (RANSAC) algorithm to fit the point cloud data to exclude outliers, and obtaining a planar model of the vehicle chassis; and determining the initial pose of the vehicle chassis based on PCA analysis and RANSAC fitting results.

Further, the station control system further comprises a locking and unlocking hole identification unit which is used for:

performing denoising and contrast enhancement preprocessing on the initial pose, and converting an original RGB image to an HSV color space;

setting thresholds in the HSV color space for segmentation, and using the Canny edge detection algorithm to identify edges in the image;

applying morphological opening and closing operations to remove small interference spots or connect broken edges, using the Hough circle transform to detect circular contours in the image, and initially locating the locking and unlocking hole;

setting detection parameters to obtain the center coordinates and radius of each detected circle, and fitting a planar model using the least squares method for each initially located locking and unlocking hole;

selecting a small region around a center of the initially located locking and unlocking hole as the ROI within the planar model, using the least squares method to fit a plane equation of a point set within the region, and adjusting a position of the center based on a plane fitting result;

extracting a normal vector from the plane equation obtained from the least squares plane fitting, and confirming whether the normal vector direction correctly points toward an opening direction of the locking and unlocking hole; and outputting the finally determined center coordinates and normal vector direction of the locking and unlocking hole.

Further, the station control system further comprises an AGV control unit which is used for:

connecting independently controlled battery swapping AGVs within the battery swapping station via a communication protocol;

performing time synchronization on the battery swapping AGVs: using the NTP to ensure consistent timestamps across all AGVs and station control systems;

performing task planning based on task requirements, the current status of the AGVs, the order of vehicle arrivals, and the type of battery pack, and dynamically assigning tasks to each AGV; and utilizing a scheduling algorithm to designate one AGV for disassembly and another AGV for assembly for the vehicle requiring battery swapping.

Further, the station control system further comprises a fault handling unit which is used for:

when one AGV fails, allowing the other AGV to switch to a standalone mode to continue the battery swapping task and send fault information.

Further, the station control system further comprises a distance control unit which is used for:

using a Leader-Follower strategy to allow the two AGVs to maintain spacing and angular deviation within a set range, using a distance sensor and an angle sensor to monitor and adjust the spacing in real time and continuously detect the relative distance between the two AGVs, and employing a spacing control algorithm to ensure that the two AGVs maintain a safe distance while traveling on a single track.

Further, the AGV further comprises a mode switching unit which is used for:

automatically or manually switching the disassembly mode, transfer mode, and assembly mode of the AGV based on the different stages of the battery swapping task.

The invention further provides a computer device, comprising a memory, a processor and a computer program stored in the memory and executable on the processor, wherein the processor, when executing the computer program, implements the method as described above.

The invention further provides a storage medium on which a computer program is stored, wherein the computer program, when executed by a processor, implements the method as described above.

The beneficial effects of the invention are as follows. The invention utilizes image processing technology to automatically identify the locking and unlocking hole pose of the vehicle chassis, and integrates parameter information from a database to ensure compatibility and select a suitable locking and unlocking operation method. This intelligent recognition and automated operation-based battery swapping control method effectively addresses the diversity of battery packs and vehicle types, enhancing the versatility and efficiency of the battery swapping station. Additionally, multiple verifications are conducted prior to the locking and unlocking operations to ensure safe and reliable operations, preventing mistakes due to inconsistent information or misjudgment.

BRIEF DESCRIPTION OF DRAWINGS

In order to more clearly explain the embodiments of the invention or the technical scheme in the prior art, the following will briefly introduce the drawings needed in the description of the embodiments or the prior art. Obviously, the drawings in the following description are only some embodiments of the invention. For those of ordinary skill in the art, other drawings can be obtained according to the provided drawings without paying creative labor.

FIG. 1 is a flowchart of a method in Embodiment 1;

DETAILED DESCRIPTION OF THE INVENTION

Figure 2:
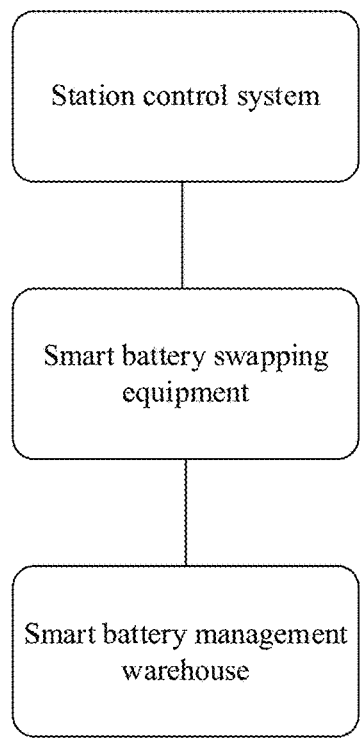
FIG. 2 is a structural diagram of a battery swapping station in Embodiment 1.

The technical schemes in the embodiments of the present invention are clearly and completely described in the following with reference to the drawings in the embodiments of the present invention. It is obvious that the described embodiments are only some of the embodiments of the present invention and are not all the embodiments thereof.

Embodiment 1

As shown in FIG. 1, a control method of a smart battery swapping station compatible with multiple battery packs comprises the following steps:

acquiring vehicle information of a vehicle requiring battery swapping, and retrieving a model type of a corresponding battery pack locking and unlocking hole and specific parameters from a database;

when the vehicle arrives at a battery swapping operation platform, capturing an image of a vehicle chassis to determine an initial pose of the vehicle chassis;

processing the initial pose to extract center coordinates of the locking and unlocking hole and a normal vector direction of the locking and unlocking hole;

comparing the center coordinates of the locking and unlocking hole and the normal vector direction of the locking and unlocking hole with the retrieved model type of battery pack locking and unlocking hole and specific parameters in the database to determine if the information is consistent;

if inconsistent, prompting a user to leave the battery swapping operation platform; if consistent, selecting, by a battery swapping AGV, a corresponding locking and unlocking operation method, and retrieving a battery from a storage for battery replacement; and once the battery swapping is complete, generating a battery swapping report and allowing the user to leave.

The invention utilizes image processing technology to automatically identify the locking and unlocking hole pose of the vehicle chassis, and integrates parameter information from a database to ensure compatibility and select a suitable locking and unlocking operation method. This intelligent recognition and automated operation-based battery swapping control method effectively addresses the diversity of battery packs and vehicle types, enhancing the versatility and efficiency of the battery swapping station. Additionally, multiple verifications are conducted prior to the locking and unlocking operations to ensure safe and reliable operations, preventing mistakes due to inconsistent information or misjudgment.

In this embodiment, acquiring vehicle information of a vehicle requiring battery swapping comprises:

setting up a camera at an entrance of the battery swapping station to capture images of vehicles entering the battery swapping station;

performing size adjustment and color space conversion on the images;

using the Canny edge detection algorithm to extract vehicle contours, employing the Hough transform method to detect geometric shapes within the vehicle contours, and acquiring point cloud data of the vehicle;

utilizing the Euclidean clustering algorithm to group different objects in the point cloud data, extracting key feature points of the vehicle contours from the clustered point cloud, and merging image features with point cloud features to form a complete feature vector; and loading a pre-trained deep learning model, inputting the feature vector into the deep learning model, and outputting a classification result of the vehicle.

By combining image processing, point cloud data processing, and deep learning techniques, efficient acquisition of vehicle information is achieved. This method utilizes multiple technical approaches to ensure the accuracy of vehicle classification, particularly advantageous in environments with diverse vehicle types. Canny edge detection and Hough transform enable effective identification of vehicle contours and geometric features, and the fusion of point cloud data and image data enhances classification precision through the formation of the feature vector.

Here, capturing an image of a vehicle chassis to determine an initial pose of the vehicle chassis comprises:

capturing a raw image of the vehicle chassis using a visual sensor, and cropping and resizing the captured raw image to a specified dimension;

utilizing a deep learning model for feature extraction, the deep learning model downsampling the input image, predicting a position of a center of a target bounding box and an offset thereof, and generating a feature map;

based on the feature map, predicting the position of the center of the target bounding box, the offset thereof, as well as the width and height of the target bounding box;

acquiring intrinsic and extrinsic parameters of a camera, converting predicted keypoint positions in the feature map to spatial coordinates of the raw image through warpAffine transformation, and generating point cloud data of the vehicle chassis based on a three-dimensional space reconstruction result;

applying voxel filtering to the point cloud data to remove noise points;

performing Euclidean clustering on the filtered point cloud, and using PCA to analyze the point cloud data to identify a primary direction of the point cloud data and estimate an approximate orientation of the vehicle chassis;

using the random sample consensus (RANSAC) algorithm to fit the point cloud data to exclude outliers, and obtaining a planar model of the vehicle chassis; and determining the initial pose of the vehicle chassis based on PCA analysis and RANSAC fitting results.

The steps of image cropping, scaling, and feature extraction ensure that the model can focus on the key chassis areas, enhancing the accuracy of subsequent steps. The point cloud data generated from images is optimized through voxel filtering and Euclidean clustering, effectively removing noise and extracting useful feature points. PCA analysis combined with RANSAC fitting ensures accurate pose estimation of the chassis, adapting to the diversity of different vehicle chassis. This provides high-precision pose estimation for battery swapping stations compatible with multiple vehicle types. Through multi-step data processing and analysis, the three-dimensional spatial position and pose of the chassis are accurately reconstructed, providing reliable input for subsequent battery swapping operations.

As a preferred option for the above embodiment, processing the initial pose to extract center coordinates of the locking and unlocking hole and a normal vector direction of the locking and unlocking hole comprises:

performing denoising and contrast enhancement preprocessing on the initial pose, and converting an original RGB image to an HSV color space;

setting thresholds in the HSV color space for segmentation, and using the Canny edge detection algorithm to identify edges in the image;

applying morphological opening and closing operations to remove small interference spots or connect broken edges, using the Hough circle transform to detect circular contours in the image, and initially locating the locking and unlocking hole;

setting detection parameters to obtain the center coordinates and radius of each detected circle, and fitting a planar model using the least squares method for each initially located locking and unlocking hole;

selecting a small region around a center of the initially located locking and unlocking hole as the ROI within the planar model, using the least squares method to fit a plane equation of a point set within the region, and adjusting a position of the center based on a plane fitting result;

extracting a normal vector from the plane equation obtained from the least squares plane fitting, and confirming whether the normal vector direction correctly points toward an opening direction of the locking and unlocking hole; and outputting the finally determined center coordinates and normal vector direction of the locking and unlocking hole.

Denoising, contrast enhancement, and color space conversion improve the visibility of the locking and unlocking hole and the clarity of the edges. HSV color space segmentation effectively distinguishes the target area from the background, reducing false detections. Canny edge detection identifies edges in the image, and morphological opening and closing operations help eliminate small interference points and repair discontinuous edges, enhancing the completeness of edge detection. By detecting circular contours, the position of the locking and unlocking hole is initially located. This method is particularly effective for detecting circular structures. Planar fitting is performed on the circular center area using the least squares method, and based on this fitting, the position of the circle center is adjusted to guarantee positioning precision. Based on the normal vector extracted from the fitted plane, the direction of the locking and unlocking hole can be accurately determined.

The precision of the extracted center coordinates of the locking and unlocking hole and the normal vector direction is ensured, thereby providing reliable geometric information for future battery swapping operations. This is particularly beneficial in scenarios with varying battery pack designs, contributing to improved system versatility and compatibility.

In this embodiment, selecting, by a battery swapping AGV, a corresponding locking and unlocking operation method, and retrieving a battery from a storage for battery replacement comprises:

implementing space relocation design to allow the battery swapping AGV to switch between different locking and unlocking methods;

utilizing a height switching mechanism to automatically adjust the height of a locking and unlocking mechanism based on height differences of battery packs for different vehicle models; and during the locking and unlocking process, making fine adjustments through adaptive floating based on changes in the position of the battery pack.

As a preferred option for the above embodiment, selecting, by a battery swapping AGV, a corresponding locking and unlocking operation method, and retrieving a battery from a storage for battery replacement further comprises:

performing battery replacement through a dual AGV coordinated control method, specifically comprising:

connecting independently controlled battery swapping AGVs within the battery swapping station via a communication protocol;

performing time synchronization on the battery swapping AGVs: using the NTP to ensure consistent timestamps across all AGVs and station control systems;

performing task planning based on task requirements, the current status of the AGVs, the order of vehicle arrivals, and the type of battery pack, and dynamically assigning tasks to each AGV; and utilizing a scheduling algorithm to designate one AGV for disassembly and another AGV for assembly for the vehicle requiring battery swapping.

By introducing a dual AGV system responsible for disassembly and assembly operations, the efficiency of battery replacement is significantly improved. The dual AGVs work in coordination to avoid the time waste of a single AGV completing disassembly before moving on to assembly, enabling parallel operations. Utilizing the NTP ensures consistent timing between the AGVs and the station control system, preventing communication and operational delays among different AGVs. This is a crucial guarantee for the collaborative work of a multi-AGV system.

Task planning based on mission requirements, AGV status, and vehicle arrival order allows for more flexible resource scheduling. Dynamic task allocation ensures that each AGV operates optimally based on current conditions, reducing idle time. During battery swapping operations, AGVs are assigned specifically for disassembly and assembly tasks, ensuring orderly task distribution and maximizing efficiency. Scheduling algorithms can be dynamically adjusted based on the load conditions and task urgency of AGVs, enhancing the overall system efficiency. Through dual AGV collaboration and an efficient scheduling system, quick and precise battery replacement operations are achieved, significantly shortening service times at battery swapping stations and improving user experience.

Here, performing battery replacement through a dual AGV coordinated control method further comprises:

autonomous fault monitoring and fault-tolerant control: when one AGV fails, the other AGV switches to a standalone mode to continue the battery swapping task and sends fault information.

In this embodiment, performing battery replacement through a dual AGV coordinated control method further comprises:

using a Leader-Follower strategy to allow the two AGVs to maintain spacing and angular deviation within a set range, using a distance sensor and an angle sensor to monitor and adjust the spacing in real time and continuously detect the relative distance between the two AGVs, and employing a spacing control algorithm to ensure that the two AGVs maintain a safe distance while traveling on a single track.

By designating one AGV as the leader and the other as the follower, the follower makes adjustments based on the real-time position and movement state of the leader. This control mode is well-suited for the collaborative operation of a dual AGV system, ensuring that two AGVs on the same track can harmoniously coordinate to execute battery swapping tasks. The distance sensor and the angle sensor are used to monitor the relative distance and angular deviation between the AGVs in real time, and the control system is used to make dynamic adjustments to maintain predetermined safe spacing and reasonable angular deviation between the two AGVs. This enhances the operation safety and precision of dual AGVs in narrow spaces.

With the established spacing control algorithm, the system can dynamically adjust the relative positions of the two AGVs during their movement based on sensor data, ensuring smooth operation in a single-track system and preventing collisions or other interference issues. In a single-track design, space is limited, and the two AGVs must maintain a safe distance with precise control. The combination of the leader-follower strategy and the spacing control algorithm ensures the reliability of the system and avoids potential congestion or safety issues.

As a preferred option for the above embodiment, the control method further comprises an ordered battery pack charging control method, comprising the following steps:

ordered charging strategy: based on the improved CSA, exploring the solution space by considering the SOC of a battery, the health status of a battery, and the scheduled usage time of a vehicle by means of random walks and optimal solution selection, so as to automatically prioritize battery charging;

load prediction and smoothing strategy: continuously collecting real-time data of each battery in the battery swapping station, utilizing a combined prediction model based on a freshness function derived from historical data and cross-entropy, receiving real-time load data of a power grid, and pre-planning the allocation of charging power in conjunction with the load prediction; and optimal battery pack scheduling strategy: based on the FIFO principle, ensuring that the batteries arriving in a warehouse first are the first to be utilized.

The charging order of batteries is optimized based on the improved CSA, the status (SOC and health status) of batteries and the scheduled usage time of vehicles by means of random walks and optimal solution selection. This strategy leverages the global search capability of the CSA to automatically prioritize battery charging under complex charging demands. The enhanced version of CSA helps accelerate convergence speed and avoids local optima issues, thereby improving battery management efficiency and ensuring that batteries with low SOC, poor health status, or those needing priority use are charged first.

The combined prediction model based on the freshness function and cross-entropy is adopted. By collecting real-time data of all batteries in the battery swapping station (such as SOC, voltage, and temperature) and integrating historical load data, load prediction is performed. This model enhances prediction accuracy, especially in effectively estimating fluctuations in short-term load. By combining real-time grid load conditions with its own predicted data, the charging power distribution at the battery swapping station can be dynamically adjusted, preventing excessive charging loads during peak periods and effectively utilizing power resources during off-peak times. This strategy reduces the impact on the grid and achieves a more stable and efficient charging process.

The FIFO principle ensures that batteries in the warehouse are used in the order they were received. This simple yet effective scheduling strategy avoids the performance degradation that may occur from long-term battery idleness while ensuring orderly usage. Coupled with the ordered charging strategy, the FIFO principle can further optimize the charging and usage cycle, ensuring that each battery operates within a healthy working period.

Here, the ordered charging strategy further comprises:
monitoring grid conditions and charging progress in real time, and when abnormal increases in grid load are detected, adjusting a charging plan by reducing charging power until the grid load returns to normal; and
receiving real-time electricity price information from the power grid, increasing the charging power when low electricity prices are detected, and reducing or stopping charging during peak price periods.

The system continuously monitors the load status of the power grid. In the event of an abnormal increase in grid load (for example, during peak electricity usage or sudden surges in demand), the system automatically adjusts the charging schedule of the battery swapping station. In cases of excessive grid load, the system helps restore normal load levels by reducing charging power or even pausing the charging of certain batteries. Once the grid load returns to normal, the system will gradually resume charging power to ensure the continuity of battery charging tasks.

The system receives and analyzes real-time electricity price information released by the power grid. During low-price periods (such as late at night or during times of low electricity demand), the system will appropriately increase charging power to take advantage of the low-cost electricity from the power grid. This not only reduces charging costs but also improves battery charging efficiency. During peak price periods (such as during the day or when electricity demand is high), the system will reduce charging power based on real-time price information, and may even pause charging if necessary, avoiding large-scale charging during peak times to lower operational costs.

The load prediction and smoothing strategy further comprises:
utilizing a combined prediction model based on a freshness function derived from historical data and cross-entropy to analyze the impact of past charging patterns, weather conditions, and holiday effects on charging demands;
using grey relational analysis to identify historical days with similar meteorological conditions and day types to a target prediction day as the benchmark for prediction, and dynamically adjusting the weights of a single prediction model based on the cross-entropy algorithm;
integrating results from prediction methods such as time series analysis and machine learning models to form a final prediction; and
employing the particle swarm algorithm to calculate a charging plan for the next day.

Based on the time decay pattern of historical data, the freshness function is applied to weight the historical charging pattern data, ensuring that the most recent charging data has a significant impact on the prediction results, while the influence of earlier data gradually decreases. The cross-entropy method is used to evaluate the reference value of historical data for current prediction, quantifying the discrepancies between the prediction results of various prediction models and the actual results. The weights of different prediction models are dynamically adjusted based on the cross-entropy results, leading to more accurate overall prediction.

The grey relational analysis method is used to identify historical days with similar meteorological conditions and day types (such as weekdays, weekends, or holidays) to a target prediction day as the benchmark for prediction. This analysis evaluates the correlation between the features of historical days and the target prediction day, selecting the most closely matching historical data to enhance prediction accuracy. Combined with the cross-entropy algorithm, weights of individual prediction models are continuously adjusted based on the historical data of similar days, dynamically optimizing the prediction results. This process ensures that the model can adapt to varying conditions, providing more reliable prediction.

Time series analysis and prediction models (like ARIMA or LSTM) are used to analyze past charging demands for trends and seasonal patterns, capturing both long-term and short-term behaviors. Machine learning models (such as random forests or neural networks) are employed for non-linear prediction, considering multiple influencing factors such as weather, holidays, and social events that may impact future charging demands. By integrating the prediction results from time series analysis and machine learning models, a final load prediction is produced. This multi-model integration helps to balance the advantages and disadvantages of various prediction methods, improving overall prediction stability and accuracy.

Based on the results of load prediction, a particle swarm optimization (PSO) algorithm is utilized to compute and adjust the charging plan for the following day. PSO simulates the foraging behavior of bird flocks in nature to seek a global optimal solution, making it suitable for multi-objective optimization problems. The PSO algorithm calculates the optimal charging power distribution scheme according to the results of load prediction, ensuring that charging tasks are reasonably arranged within the allowable range of the grid load, thereby avoiding excessive loads during peak times.

Utilizing a combination of various models and methods results in more accurate prediction results, particularly when dealing with complex environmental changes, allowing for more effective adjustments in prediction strategies. With grey relational analysis and cross-entropy weight adjustments, the prediction models can adaptively handle the influences of weather fluctuations, holiday effects, and other factors. The PSO algorithm guarantees a global optimal solution for the charging plan, facilitating efficient charging power distribution and preventing overload in the power grid.

The optimal battery pack scheduling strategy further comprises:
collecting key parameters such as battery voltage, current, temperature, and SOC in real time to assess the health status of the battery;
utilizing big data analysis and machine learning techniques to predict trends in battery lifespan;
setting thresholds for battery health status, and if the monitored battery status falls below the thresholds, immediately removing the battery from the battery swapping service for inspection or repair; and
maintaining a reserve of fully charged backup batteries above a specified quantity, and ensuring balanced usage of all batteries to prevent any single battery from being overcharged or excessively discharged.

Real-time monitoring of battery voltage, current, temperature, and SOC is essential. These key parameters help assess the current health status of the battery and provide real-time feedback during the charging process. By analyzing these critical parameters, the health of the battery can be evaluated to ensure that the battery operates under optimal conditions. Big data technology is utilized to collect historical usage data and real-time monitoring data of the battery. By analyzing factors such as charge and discharge patterns and operating environments of batteries, a battery life prediction model is constructed. Machine learning algorithms (such as regression analysis, support vector machines, or deep learning models) are then applied to predict the lifespan trends of batteries. The model can identify early signs of battery aging and predict future performance changes.

Thresholds for the health status of batteries are set, such as minimum voltage, maximum temperature, and minimum SOC. Upon detecting that the status of a battery falls below the established thresholds, the system will automatically remove the battery from the battery swapping service. Batteries that are below the thresholds will be inspected and repaired to ensure that only those in good health are used for the battery swapping service. This reduces the impact of faulty batteries on the battery swapping service and enhances the reliability of the system.

A reserve of fully charged backup batteries above a specified quantity are maintained to ensure immediate replacement of faulty batteries or provision of charging services when necessary. By evenly distributing the use of all batteries, the risk of overcharging or excessively discharging any one battery is avoided. Balanced usage can extend the lifespan of the batteries and reduce the uneven degradation of battery performance.

By means of real-time monitoring and prediction of battery health, battery issues can be addressed promptly, extending the effective usage time of batteries and reducing the frequency of replacement. This ensures that only healthy batteries are used for the battery swapping services, thereby improving battery swapping reliability and user satisfaction. Through big data analysis and machine learning prediction, battery maintenance and management can be optimized, reducing operational disruptions caused by battery failures and saving operational costs. Setting health status thresholds and conducting real-time monitoring allow for the timely detection and resolution of potential battery safety issues, ensuring that batteries operate within safe limits and minimizing safety risks.

As shown in FIG. 2, a smart battery swapping station compatible with multiple battery packs is also provided in this embodiment, comprising:
a station control system, smart battery swapping equipment, and a smart battery management warehouse, all communicatively connected; wherein
the smart battery swapping equipment comprises a plurality of AGVs equipped with a plurality of locking and unlocking modules corresponding to different vehicle types and battery pack locking mechanisms;
the smart battery management warehouse stores a plurality of batteries and charges the same; and
the station control system is used for acquiring vehicle information of a vehicle requiring battery swapping, and retrieving a model type of a corresponding battery pack locking and unlocking hole and specific parameters from a database; when the vehicle arrives at a battery swapping operation platform, capturing an image of a vehicle chassis to determine an initial pose of the vehicle chassis; processing the initial pose to extract center coordinates of the locking and unlocking hole and a normal vector direction of the locking and unlocking hole; comparing the center coordinates of the locking and unlocking hole and the normal vector direction of the locking and unlocking hole with the retrieved model type of battery pack locking and unlocking hole and specific parameters in the database to determine if the information is consistent; if inconsistent, prompting a user to leave the battery swapping operation platform;
if consistent, controlling, by the smart battery swapping equipment, the battery swapping AGVs to select a corresponding locking and unlocking operation method, and retrieving a battery from the smart battery management warehouse for battery replacement; and
once the battery swapping is complete, generating a battery swapping report and allowing the user to leave.

The station control system comprises:
a technical architecture which allows the station control system to communicate in real time with the smart battery swapping equipment, the smart battery management warehouse, and other equipment and systems within the battery swapping station, perceives the entire process of battery swapping and monitors the environmental information within the battery swapping station, providing battery swapping monitoring data to a battery swapping station operation system and government management platforms;
a network architecture which employs the TCP/IP network protocol to support the access and acquisition of diverse devices, the station control system using MySQL for data storage and processing and being equipped with SQL query algorithms; and
a business architecture which ensures the smooth flow of automated battery swapping through battery swapping monitoring, maintains the stability of the environment and facilities within the station with auxiliary equipment monitoring, prevents and responds to potential risks through safety management, provides decision-making support through operational analysis, coordinates equipment and user data through system management, and facilitates seamless integration with external platforms through service management.

Here, the smart battery swapping equipment further comprises:
a flexible battery swapping operation platform designed to automatically adjust vehicle positions, provide a designated operational area for electric vehicle parking, accommodate various types of vehicles with different track widths and wheelbases, and automatically locate the vehicles.

As a preferred option for the above embodiment, the AGV also comprises Mecanum wheels, a servo motor, a vision system, laser radar, and a sensor; and
the smart battery swapping station further comprises:
a space relocation mechanism which allows the AGV to switch between different locking and unlocking methods;
a height switching mechanism which automatically adjusts the height of a locking and unlocking mechanism based on height differences of battery packs for different vehicle models; and an adaptive floating mechanism which, during the locking and unlocking process, makes fine adjustments through adaptive floating based on changes in the position of the battery pack.

The smart battery management warehouse comprises:
a dynamic charging scheduling unit which employs machine learning algorithms to predict battery demands and grid loads and dynamically adjust a charging plan;
a battery life optimization unit which selects the most suitable charging rate based on the battery type and current status, preventing overcharging or excessive discharging to extend battery life, and formulates a regular maintenance plan based on data analysis to ensure the long-term health of the battery packs; and
a flexible storage and scheduling unit which works in conjunction with the battery swapping AGVs to enable automated storage and retrieval of the battery packs, and automatically allocates the battery packs to charging stations or storage areas based on the battery status and charging demands.

Here, the smart battery management warehouse further comprises:
an ordered charging unit which, based on the improved CSA, explores the solution space by considering the SOC of a battery, the health status of a battery, and the scheduled usage time of a vehicle by means of random walks and optimal solution selection, so as to automatically prioritize battery charging;
a load prediction and smoothing unit which continuously collects real-time data of each battery in the battery swapping station, utilizes a combined prediction model based on a freshness function derived from historical data and cross-entropy, receives real-time load data of a power grid, and pre-plans the allocation of charging power in conjunction with the load prediction; and
an optimal battery pack scheduling unit which, based on the FIFO principle, ensures that the batteries arriving in a warehouse first are the first to be utilized.

In this embodiment, the ordered charging unit is further used for:
monitoring grid conditions and charging progress in real time, and when abnormal increases in grid load are detected, adjusting a charging plan by reducing charging power until the grid load returns to normal; and
receiving real-time electricity price information from the power grid, increasing the charging power when low electricity prices are detected, and reducing or stopping charging during peak price periods.

As a preferred option for the above embodiment, the load prediction and smoothing unit is further used for:
utilizing a combined prediction model based on a freshness function derived from historical data and cross-entropy to analyze the impact of past charging patterns, weather conditions, and holiday effects on charging demands;
using grey relational analysis to identify historical days with similar meteorological conditions and day types to a target prediction day as the benchmark for prediction, and dynamically adjusting the weights of a single prediction model based on the cross-entropy algorithm;
integrating results from prediction methods such as time series analysis and machine learning models to form a final prediction; and
employing the particle swarm algorithm to calculate a charging plan for the next day.

The optimal battery pack scheduling unit is further used for:
collecting key parameters such as battery voltage, current, temperature, and SOC in real time to assess the health status of the battery;
utilizing big data analysis and machine learning techniques to predict trends in battery lifespan;
setting thresholds for battery health status, and if the monitored battery status falls below the thresholds, immediately removing the battery from the battery swapping service for inspection or repair; and
maintaining a reserve of fully charged backup batteries above a specified quantity, and ensuring balanced usage of all batteries to prevent any single battery from being overcharged or excessively discharged.

In this embodiment, the station control system further comprises a vehicle information identification unit which is used for:
setting up a camera at an entrance of the battery swapping station to capture images of vehicles entering the battery swapping station;
performing size adjustment and color space conversion on the images;
using the Canny edge detection algorithm to extract vehicle contours, employing the Hough transform method to detect geometric shapes within the vehicle contours, and acquiring point cloud data of the vehicle;
utilizing the Euclidean clustering algorithm to group different objects in the point cloud data, extracting key feature points of the vehicle contours from the clustered point cloud, and merging image features with point cloud features to form a complete feature vector; and
loading a pre-trained deep learning model, inputting the feature vector into the deep learning model, and outputting a classification result of the vehicle.

The station control system further comprises an initial pose identification unit which is used for:
capturing a raw image of the vehicle chassis using a visual sensor, and cropping and resizing the captured raw image to a specified dimension;
utilizing a deep learning model for feature extraction, the deep learning model downsampling the input image, predicting a position of a center of a target bounding box and an offset thereof, and generating a feature map;
based on the feature map, predicting the position of the center of the target bounding box, the offset thereof, as well as the width and height of the target bounding box;
acquiring intrinsic and extrinsic parameters of a camera, converting predicted keypoint positions in the feature map to spatial coordinates of the raw image through warpAffine transformation, and generating point cloud data of the vehicle chassis based on a three-dimensional space reconstruction result;
applying voxel filtering to the point cloud data to remove noise points;
performing Euclidean clustering on the filtered point cloud, and using PCA to analyze the point cloud data to identify a primary direction of the point cloud data and estimate an approximate orientation of the vehicle chassis;
using the random sample consensus (RANSAC) algorithm to fit the point cloud data to exclude outliers, and obtaining a planar model of the vehicle chassis; and
determining the initial pose of the vehicle chassis based on PCA analysis and RANSAC fitting results.

As a preferred option for the above embodiment, the station control system further comprises a locking and unlocking hole identification unit which is used for:

performing denoising and contrast enhancement preprocessing on the initial pose, and converting an original RGB image to an HSV color space;

setting thresholds in the HSV color space for segmentation, and using the Canny edge detection algorithm to identify edges in the image;

applying morphological opening and closing operations to remove small interference spots or connect broken edges, using the Hough circle transform to detect circular contours in the image, and initially locating the locking and unlocking hole;

setting detection parameters to obtain the center coordinates and radius of each detected circle, and fitting a planar model using the least squares method for each initially located locking and unlocking hole;

selecting a small region around a center of the initially located locking and unlocking hole as the ROI within the planar model, using the least squares method to fit a plane equation of a point set within the region, and adjusting a position of the center based on a plane fitting result;

extracting a normal vector from the plane equation obtained from the least squares plane fitting, and confirming whether the normal vector direction correctly points toward an opening direction of the locking and unlocking hole; and outputting the finally determined center coordinates and normal vector direction of the locking and unlocking hole.

Here, the station control system further comprises an AGV control unit which is used for:

connecting independently controlled battery swapping AGVs within the battery swapping station via a communication protocol;

performing time synchronization on the battery swapping AGVs: using the NTP to ensure consistent timestamps across all AGVs and station control systems;

performing task planning based on task requirements, the current status of the AGVs, the order of vehicle arrivals, and the type of battery pack, and dynamically assigning tasks to each AGV; and utilizing a scheduling algorithm to designate one AGV for disassembly and another AGV for assembly for the vehicle requiring battery swapping.

The station control system further comprises a fault handling unit which is used for:

when one AGV fails, allowing the other AGV to switch to a standalone mode to continue the battery swapping task and send fault information.

In this embodiment, the station control system further comprises a distance control unit which is used for:

using a Leader-Follower strategy to allow the two AGVs to maintain spacing and angular deviation within a set range, using a distance sensor and an angle sensor to monitor and adjust the spacing in real time and continuously detect the relative distance between the two AGVs, and employing a spacing control algorithm to ensure that the two AGVs maintain a safe distance while traveling on a single track.

As a preferred option for the above embodiment, the AGV further comprises a mode switching unit which is used for:

automatically or manually switching the disassembly mode, transfer mode, and assembly mode of the AGV based on the different stages of the battery swapping task.

Embodiment 2

Figure 3:
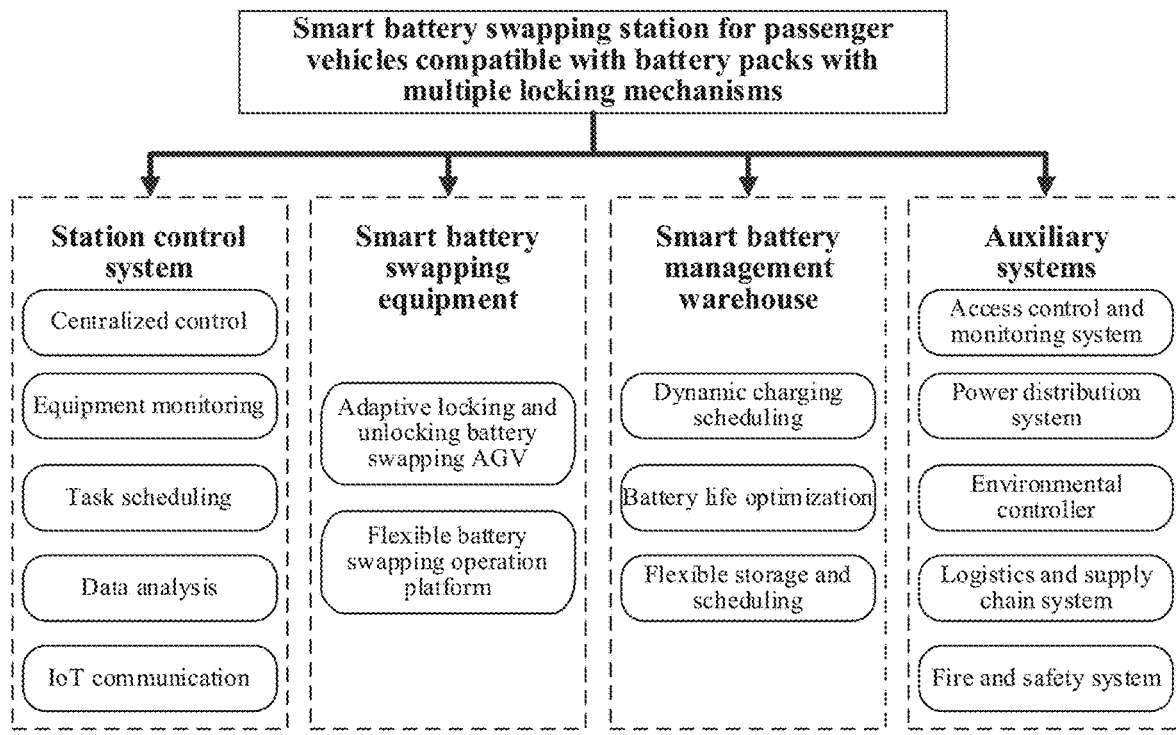
FIG. 3 illustrates a topology of a smart battery swapping station for passenger vehicles compatible with battery packs with multiple locking mechanisms in Embodiment 2.

As shown in FIG. 3, a smart battery swapping station for passenger vehicles compatible with battery packs with multiple locking mechanisms is provided in this embodiment, comprising a station control system, smart battery swapping equipment, a smart battery management warehouse, and auxiliary systems.

The station control system is responsible for overall coordination and control, enabling real-time communication with the smart battery swapping equipment, the smart battery management warehouse, and the auxiliary systems within the battery swapping station, thus collaboratively controlling dual adaptive locking and unlocking battery swapping AGVs for the replacement of battery packs with multiple locking mechanisms. The station control system features functionalities such as equipment monitoring, task scheduling, safety management, and data analysis, collecting information during the battery swapping process and monitoring environmental parameters to ensure the safety and efficiency of the battery swapping operation.

The smart battery swapping equipment autonomously replaces the battery of a vehicle by selecting an appropriate locking and unlocking module based on the locking mechanism of the battery pack.

The smart battery management warehouse is designed for the centralized and ordered charging of batteries within the warehouse and managing the storage of battery packs. The smart battery management warehouse also optimizes charging strategies to extend battery life and improve charging efficiency, while intelligently interacting with the power grid to alleviate grid pressure.

The auxiliary systems include, but not limited to, a power distribution system, an environmental controller, a logistics and supply chain system, a fire and safety system, an access control and monitoring system, a ventilation and lighting system, and a waste treatment and recycling system.

Figure 4:
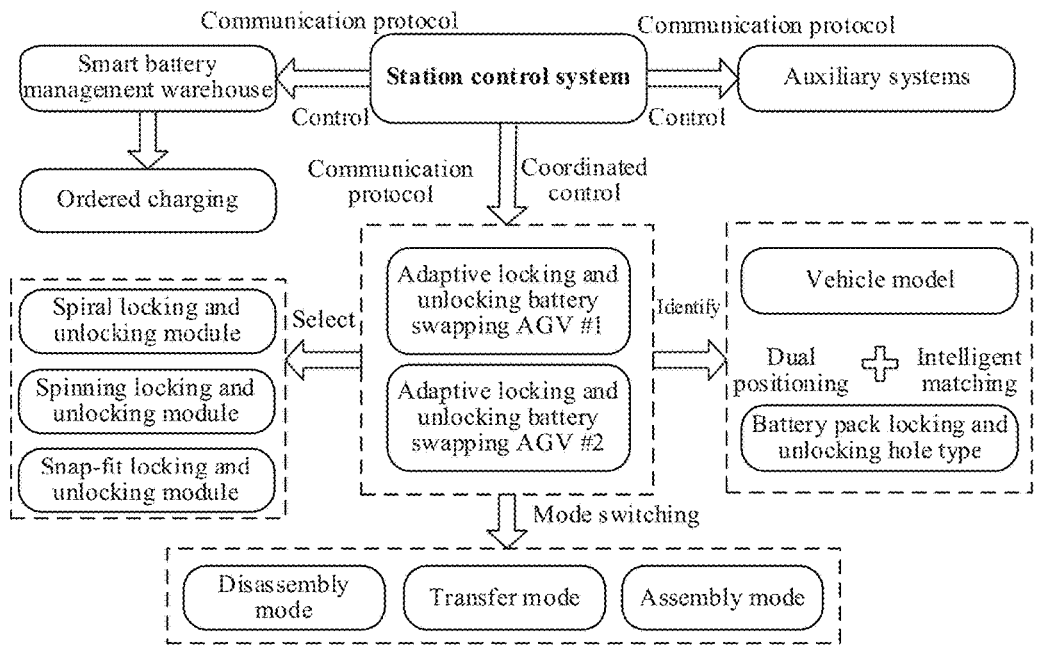
FIG. 4 illustrates a control topology of a smart battery swapping station for passenger vehicles compatible with battery packs with multiple locking mechanisms in Embodiment 2.

As shown in FIG. 4, the station control system acts as the brain of the smart battery swapping station, integrating advanced central processing units responsible for collecting, processing, and analyzing information from various devices within the battery swapping station, including data from the smart battery swapping equipment, the smart battery management warehouse, and various sensors. This ensures a smooth and efficient battery swapping process. The station control system connects to all smart devices in the station via a high-speed communication bus, enabling instant data exchange and command transmission to ensure coordinated operations between devices, such as updating AGV position information and checking the status of battery packs.

The AGV is equipped with interchangeable locking and unlocking devices that can automatically identify and switch to the corresponding module based on different locking mechanisms of battery packs, ensuring compatibility with battery packs with multiple locking mechanisms. The AGV is equipped with high-precision cameras and sensors to identify the features of the vehicle chassis and the position of the battery pack, ensuring the accuracy and safety of the locking and unlocking operations. Advanced scheduling algorithms are employed to intelligently adjust the charging order and rate of battery packs based on grid load, battery status, and user demands, and the FIFO principle is adopted to prevent overcharging and excessive discharging, thereby extending battery life. The status of each battery pack is continuously monitored, including parameters such as voltage, current, and temperature, and timely warnings for potential failures are provided to ensure safe battery operation. Machine learning algorithms are applied to predict battery demands and grid load, allowing for proactive charging strategy planning to balance peak and off-peak loads and reduce grid pressure, thus enhancing the overall efficiency of a power system. Environmental parameters such as temperature, humidity, and air quality within the battery swapping station are also monitored, so as to maintain suitable conditions for battery storage and charging to minimize the impact of environmental factors on battery performance. Additionally, the AGV is equipped with safety systems such as fire alarms, smoke detection, and emergency shutdown to ensure the safety of personnel and equipment during the operation of the battery swapping station.

The intelligent scheduling achieved through the station control system leads to a high degree of automation in the battery swapping process while accommodating various battery locking mechanisms, significantly enhancing the service range and efficiency of the battery swapping station. The ordered charging strategy not only balances the grid load and optimizes the allocation of electrical resources but also reduces charging costs, bringing economic benefits to both users and power companies. By balancing peak and off-peak loads and reducing fluctuations in electricity demand, this approach contributes to the stable operation of the power system, improves the utilization efficiency of electrical resources and promotes the sustainable development of the power grid.

In a second aspect, a control method of a smart battery swapping station for passenger vehicles compatible with battery packs with multiple locking mechanisms comprises: an intelligent matching and adaptive locking and unlocking control method, a dual AGV coordinated control method, and an ordered battery pack charging control method.

The intelligent matching and adaptive locking and unlocking control method is designed to address the compatibility of battery packs in the battery swapping station and ensure the precision of locking and unlocking operations. This method utilizes deep learning algorithms and image processing technology to accurately identify the vehicle chassis and the battery pack locking and unlocking hole, ensuring that battery packs of different vehicle models and locking mechanisms can be accurately matched and operated.

The dual AGV coordinated control method is designed for the station control system to control two independent AGVs that work collaboratively on a single track. Through a communication bus, the two AGVs share position information and task status in real time, with one responsible for disassembly and the other for assembly. This parallel processing improves the efficiency and safety of the battery swapping operation.

According to the ordered battery pack charging control method, the station control system controls the charging optimization, maintenance, and storage of battery packs, extending battery life and improving charging efficiency. Algorithms are used to predict battery demands and grid load, thereby intelligently adjusting the charging schedule to avoid peak hours.

Figure 5:
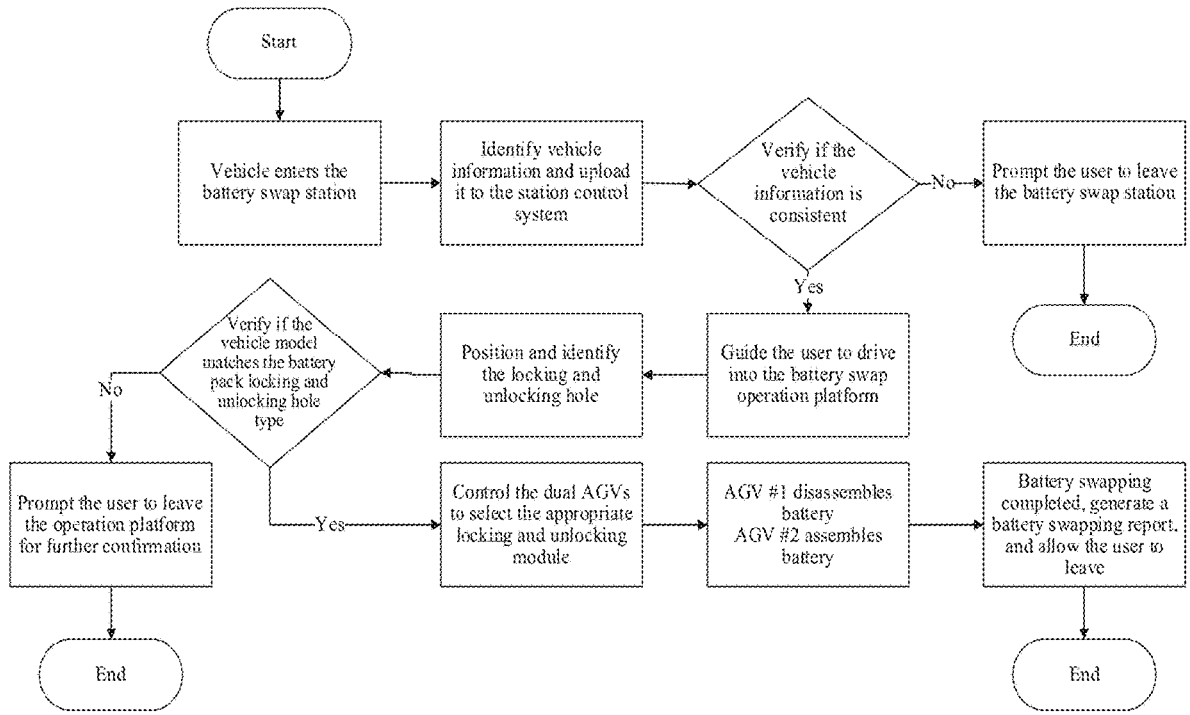
FIG. 5 illustrates a battery swapping flowchart of a smart battery swapping station for passenger vehicles compatible with battery packs with multiple locking mechanisms in Embodiment 2.

As shown in FIG. 5, when an electric vehicle enters the entrance area of the battery swapping station, a vehicle recognition sensor at the entrance automatically captures and analyzes the model and license plate information of the vehicle, and subsequently sends key data to the station control system. The station control system verifies the consistency of the license plate, model, and battery pack ID information of the vehicle, including the consistency of the license plate with the vehicle model, the match between the battery pack ID and its model, the legitimacy of the vehicle user, and the legitimacy of the battery pack.

When the vehicle information is found to be inconsistent, the station control system activates a response to guide the driver to leave the battery swapping station promptly, avoiding unnecessary delays. Once the vehicle information is verified as correct, the station control system enters the preparation phase for battery swapping, confirming the battery pack information, vehicle configuration, inventory location of the replacement battery, and temporary storage space for the recovered battery, ensuring that the smart battery swapping device can accurately execute the upcoming tasks. With the battery swapping preparation command confirmed, the station control system sends a signal to open the gate, guiding the user to smoothly enter the battery swapping area. Following the instructions, the driver parks the vehicle at the designated position on the battery swapping operation platform, where the adaptive locking and unlocking battery swapping AGVs, equipped with the high-resolution cameras, identify the vehicle chassis morphology, locate the battery pack locking and unlocking hole, and determine the locking type. The information is transmitted to the station control system for matching with the vehicle information. If a mismatch between the vehicle information and the locking type is detected, the driver is guided to leave the operation platform while waiting for further confirmation from the station personnel. When the vehicle information matches the locking type, the station control system controls the dual adaptive locking and unlocking battery swapping AGVs to select the appropriate locking and unlocking module. The battery swapping process then begins, with adaptive locking and unlocking battery swapping AGV #1 moving to the bottom of the vehicle to remove the depleted battery and placing it on the swapping platform. After adaptive locking and unlocking battery swapping AGV #1 leaves the battery swapping operation platform, adaptive locking and unlocking battery swapping AGV #2 quickly moves into position and installs the fully charged battery onto the bottom of the vehicle, completing the battery swapping process.

The station control system continuously retrieves the operational parameters and status of the battery swapping equipment and performs fault monitoring and alarm processing according to safety protocols. The system generates process data such as battery swapping monitoring records and alarm logs. After the battery swapping is completed, the station control system creates a battery swapping record and establishes a correspondence record between battery packs and vehicles. The system notifies that the battery swapping is completed and opens the gate to allow the vehicle to exit.

Figure 6:
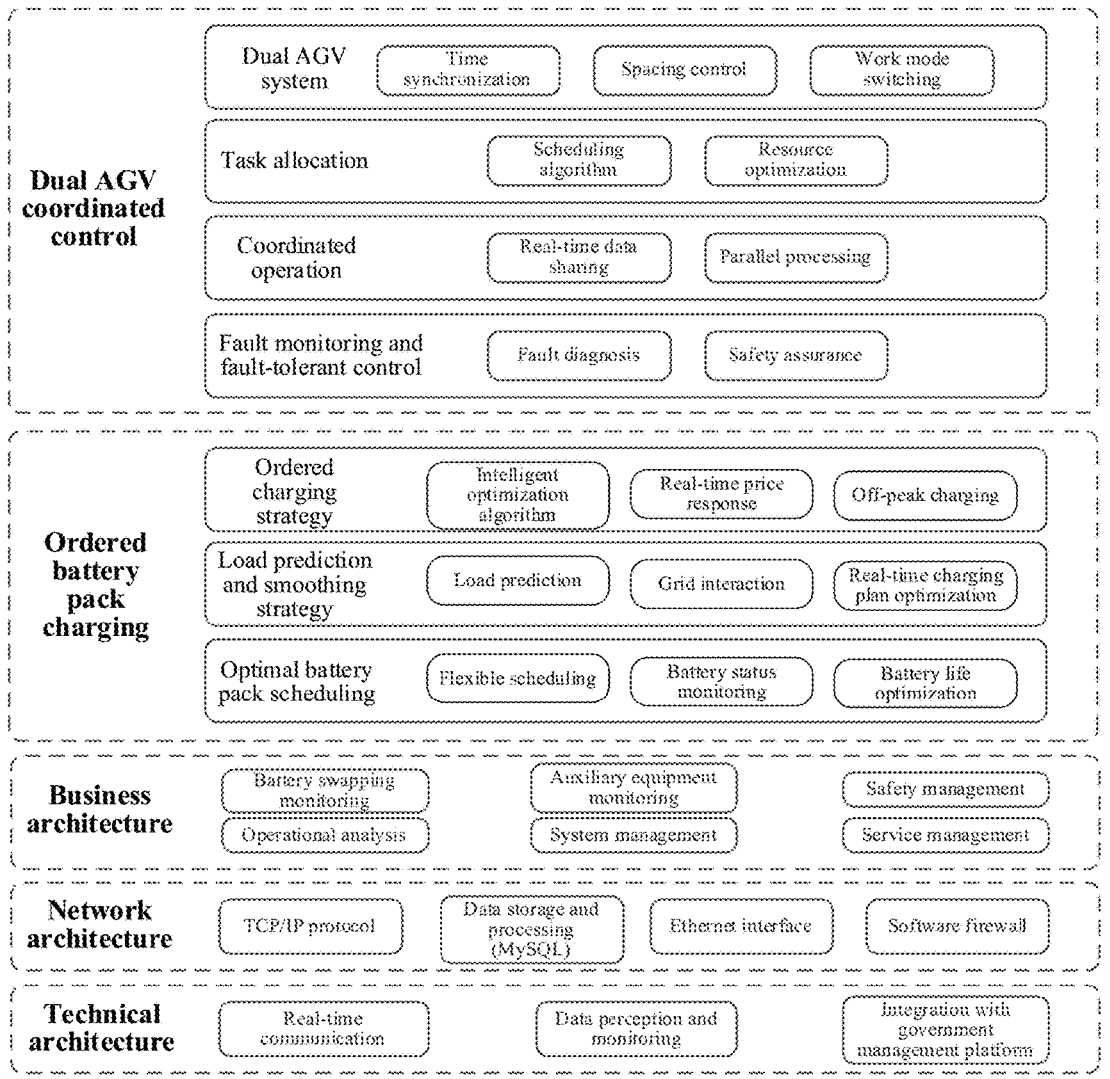
FIG. 6 is an overall system architecture diagram of a station control system in Embodiment 2.

As shown in FIG. 6, the overall system architecture of the station control system comprises dual AGV coordinated control, ordered battery pack charging, network architecture, technical architecture, and business architecture. The dual AGV coordinated control comprises a dual AGV system, time synchronization, spacing control, mode switching, task allocation, coordinated operation, and autonomous fault monitoring and fault-tolerant control.

Dual AGV system: The single-track "flexible" dual AGV system consists of two independently controlled vehicles (AGVs). Communication between the dual AGVs and between the AGVs and the station control system is established through RS485 communication lines, forming a triangular network structure. The station control system acts as the main node, responsible for task allocation and status monitoring, while the AGVs serve as subordinate nodes, receiving commands and uploading status. This setup enables each AGV to accomplish the battery pack replacement task either autonomously or through centralized control from an upper system. Connected to the station control system via communication protocols, the AGVs can autonomously perceive the environment and make decisions.

Time synchronization: Through time synchronization technology, the system ensures that the two AGVs are accurately synchronized while performing tasks, avoiding task conflicts caused by time discrepancies. The NTP is employed to ensure that all the AGVs and the station control system have consistent timestamps, and keep the time error between the dual AGVs within the millisecond range.

Spacing control: The Leader-Follower strategy is used to allow the two AGVs to maintain spacing and angular deviation within a set range, a distance sensor and an angle sensor are employed to monitor and adjust the spacing in real time and continuously detect the relative distance between the two AGVs, and a spacing control algorithm is used to ensure that the two AGVs maintain a safe distance while traveling on a single track, stabilizing their formation and preventing collisions.

Mode switching: A mode-switching design based on visual and inertial navigation is developed, allowing the AGVs to automatically or manually switch between different operational modes, such as disassembly mode, transfer mode, and assembly mode, according to the various stages of the battery swapping task. This mode switching is managed through a control panel of the station control system, ensuring that the AGVs can efficiently transition to the required operational mode based on task demands.

Task allocation: The station control system plans tasks based on factors such as task requirements, the current status of the AGVs, vehicle arrival order, and battery pack types, and dynamically assigns specific tasks to each AGV using a scheduling algorithm, designating one AGV for disassembly operation and the other for assembly operation. This ensures reasonable task allocation, avoids resource waste, and improves battery swapping efficiency.

Coordinated operation: Through a communication bus, the two AGVs share real-time data such as position information and task status, ensuring efficient collaborative work. A cooperative strategy is employed to ensure that during the battery swapping process, one AGV is responsible for disassembling the depleted battery pack while the other AGV handles the assembly of the fully charged battery pack, enabling parallel processing.

Autonomous fault monitoring and fault-tolerant control: The AGV system is equipped with a multi-layered safety protection mechanism, including laser obstacle avoidance, emergency shutdown, safety contact edges, and limit switches. This ensures that each AGV has autonomous fault monitoring capabilities, allowing it to continuously monitor its operational status and health. If a fault is detected, the system can automatically diagnose the type and cause of the fault and take appropriate action. If one AGV fails, the other can switch to a standalone mode to continue the battery swapping task. The system can promptly send fault information to the station control system to alert maintenance personnel. In cases of complex faults or when the system cannot handle the issue automatically, the system can issue a request for manual intervention. The AGV coordinated control system is designed with redundancy and recovery mechanisms, allowing for task continuity by readjusting formation or task allocation through the station control system in the event of a fault in a single AGV.

The ordered battery pack charging control method comprises an ordered charging strategy, a load prediction and smoothing strategy, and an optimal battery pack scheduling strategy.

Ordered charging strategy: Based on the improved CSA, the system explores the solution space by considering the SOC of a battery, the health status of a battery, and the scheduled usage time of a vehicle by means of random walks and optimal solution selection, so as to automatically prioritize battery charging. Further, the system monitors grid conditions and charging progress in real time, and when abnormal increases in grid load are detected, adjusts a charging plan by reducing charging power until the grid load returns to normal. The station control system receives real-time electricity price information from the power grid, increases the charging power when low electricity prices are detected, and reduces or even stops charging during peak price periods to avoid high electricity costs.

Load prediction and smoothing strategy: The station control system continuously collects real-time data of each battery in the battery swapping station, including parameters such as SOC, health status, charging rate, and temperature, and utilizes a combined prediction model based on a freshness function derived from historical data and cross-entropy to analyze the impact of past charging patterns, weather conditions, and holiday effects on charging demands. The freshness function accounts for the time decay effect of data, and the cross-entropy algorithm optimizes the weights of the prediction model, enhancing prediction accuracy and stability. The system uses grey relational analysis to identify historical days with similar meteorological conditions and day types to a target prediction day as the benchmark for prediction, and dynamically adjusts the weights of a single prediction model based on the cross-entropy algorithm; and integrates results from various prediction methods such as time series analysis and machine learning models to form a final prediction. The station control system receives real-time load data of the power grid, and pre-plans the allocation of charging power in conjunction with the load prediction to avoid heavy charging during peak grid load times. The system employs the particle swarm algorithm to calculate a charging plan for the next day, ensuring that charging loads are distributed during periods of lower grid load, such as at night.

Optimal battery pack scheduling strategy: Based on the FIFO principle, the system ensures that the batteries arriving in a warehouse first are the first to be utilized, avoiding the performance degradation that may occur from long-term battery idleness. By prioritizing the use of batteries in better health, the quality of the battery swapping service is guaranteed. Batteries with poor health are either maintained or retired to avoid compromising overall performance. The system designs efficient battery replacement paths to reduce the time needed for battery replacement by robotic arms or manually, thereby enhancing battery swapping efficiency. The station control system continuously collects key parameters such as battery voltage, current, temperature, and SOC to assess battery health. Utilizing big data analysis and machine learning techniques, the system predicts battery lifespan trends, promptly identifies potential faults, and schedules preventive maintenance or replacement. The system sets thresholds for battery health status, and if the monitored battery status falls below the thresholds, immediately removes the battery from the battery swapping service for inspection or repair. The station control system maintains a certain number of fully charged backup batteries to address sudden charging demands or grid anomalies. Through balanced use of all batteries, the system prevents overcharging or excessive discharging of any single battery, thus extending the overall lifespan of the batteries.

Technical architecture: The station control system communicates in real time with the adaptive locking and unlocking battery swapping AGVs, an environmental controller, and vehicle recognition equipment, perceives the entire process of battery swapping and monitors the environmental information within the battery swapping station, providing battery swapping monitoring data to a battery swapping station operation system and government management platforms. This ensures that the entire process is measurable, observable, and controllable, and that the charging and swapping processes are efficient and reliable, while also safeguarding the safety of equipment and personnel.

Network architecture: The station control system utilizes the TCP/IP network protocol, allowing for standardized high-level protocols that provide a variety of reliable network services, thereby supporting the access and acquisition of diverse devices. The station control system employs MySQL for data storage and processing, featuring optimized SQL query algorithms that significantly enhance query speeds. Other systems access the station control system via Ethernet to retrieve battery swapping-related business data. An industrial control computer in the station control system is equipped with four Ethernet ports, designated for independent connections to the smart battery swapping equipment, an industrial-grade switch, an access for other systems, and an expansion port. A software firewall is used to manage and configure the four Ethernet ports to ensure the security of the station control system.

Figure 7:
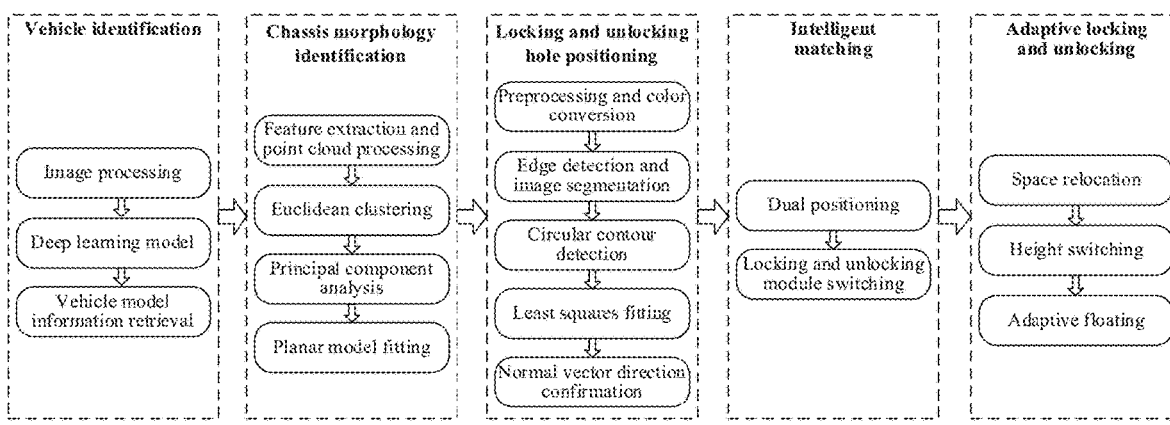
FIG. 7 depicts a control flowchart for intelligent matching and adaptive locking and unlocking in Embodiment 2.

As shown in FIG. 7, when a vehicle enters the battery swapping station, a high-definition camera installed at the entrance captures the image of the vehicle. The acquired image undergoes resizing and color space conversion to meet subsequent processing requirements. The Canny edge detection algorithm is then used to extract the vehicle contours, methods like Hough transform are used to detect geometric shapes within the vehicle contours, and point cloud data of the vehicle and its chassis are obtained. The Euclidean clustering algorithm groups different objects within the point cloud data. Key feature points of the vehicle contours are extracted from the clustered point cloud. The image features are fused with the point cloud features to form a complete feature vector. A pre-trained deep learning model is loaded, and the feature vector obtained after fusion is input into the model. The model outputs the classification result of the vehicle, specifically the model type. The identified model information is then used to query relevant data in the database, retrieving the corresponding battery pack locking and unlocking hole model types and specific parameters, and the identified vehicle model information and specific parameters of the locking and unlocking hole are subsequently uploaded to the station control system.

When the vehicle is parked at the battery swapping operation platform, a visual sensor captures the raw image of the chassis to be photographed. The captured raw image is then cropped and scaled to a uniform size. A deep learning model (such as DLA-34) is employed for feature extraction, which downsamples the input image, predicts the position of the center of the target bounding box and the offset thereof, and generates a feature map. Based on the feature map, the model predicts the position of the center of the target bounding box, the offset thereof, as well as the width and height of the target bounding box. The intrinsic and extrinsic parameters of the camera are set to enable the conversion of information from the two-dimensional image into three-dimensional space. Using the warpAffine transformation, the predicted keypoint positions from the feature map are converted to spatial coordinates in the raw image. Based on the three-dimensional space reconstruction result, point cloud data of the vehicle chassis is generated. Voxel filtering is applied to the point cloud data to remove noise points, resulting in a smoother point cloud. Euclidean clustering is performed on the filtered point cloud to group points belonging to the same object. PCA is used to analyze the point cloud data to identify the primary direction of the point cloud data and estimate the approximate orientation of the vehicle chassis. The RANSAC algorithm is used to fit the point cloud data to exclude outliers, and a planar model of the vehicle chassis is obtained. The initial pose of the vehicle chassis is determined based on PCA analysis and RANSAC fitting results.

Denoising and contrast enhancement preprocessing are performed on the obtained initial pose of the vehicle chassis, and an original RGB image is converted to the HSV color space. Based on the color characteristics of the locking and unlocking hole, thresholds are set in the HSV color space for segmentation, and the locking and unlocking hole area is highlighted. The Canny edge detection algorithm is used to identify edges in the image, morphological opening and closing operations are applied to remove small interference spots or connect broken edges, and the Hough circle transform is used to detect circular contours in the image, so as to initially locate the locking and unlocking hole. Appropriate detection parameters, such as the range of circle radii and accumulator thresholds, are set to obtain the center coordinates and radius of each detected circle, and a planar model is fit using the least squares method for each initially located locking and unlocking hole, so as to further optimize the center position. A small region around the initially located center is selected as the ROI, the least squares method is used to fit a plane equation of a point set within the region, and a position of the center is adjusted based on a plane fitting result to ensure that it lies on the best-fit plane. A normal vector is extracted from the plane equation obtained from the least squares plane fitting, and whether the normal vector direction correctly points toward an opening direction of the locking and unlocking hole is confirmed. The finally determined center coordinates and normal vector direction of the locking and unlocking hole are output.

Upon obtaining vehicle model information from the identification process of multi-model/multi-type battery packs, the locking and unlocking hole model type to retrieve is clarified based on the vehicle model query result. The battery swap station database is searched for matching battery pack locking and unlocking hole model types and specific parameters thereof for the vehicle model. The identified locking and unlocking hole information (such as center position and normal direction) is compared with the information in the database to ensure that the locking and unlocking hole model type aligns perfectly with the recorded information in the database. Based on the matched locking and unlocking hole model type, the battery swapping AGVs select an appropriate locking and unlocking operation method.

Space relocation design allows the battery swapping AGV to quickly switch between different locking and unlocking methods within a limited space. By adopting a height switching mechanism, the system can automatically adjust the height of the locking and unlocking mechanism according to the height differences of various vehicle battery packs, achieving precise matching. This overcomes the precision design challenge of a tonnage-level locking and unlocking mechanism with significant push-pull forces within an extremely limited space, ensuring the stability and reliability of the system. Rapid switching among three types of locking and unlocking mechanisms is achieved, accommodating the locking and unlocking needs of battery packs for different vehicle models. Through the adaptive floating function of the highly integrated locking and unlocking mechanism, it ensures that during the locking and unlocking process, the system can make fine adjustments according to changes in the battery pack position, guaranteeing the accuracy and safety of the locking and unlocking operation.

Figure 8:
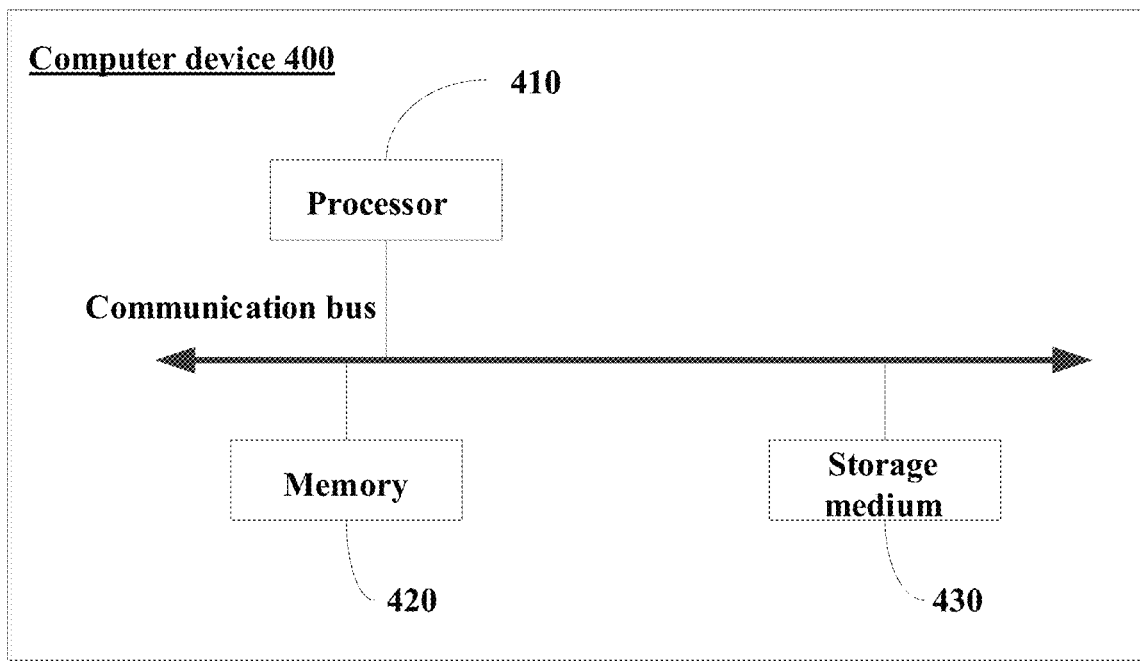
FIG. 8 is a structural diagram of a computer device.

Refer to the structural diagram of a computer device provided by an embodiment of the application shown in FIG. 8. The computer device 400 provided by the embodiment of the application comprises a processor 410 and a memory 420, the memory 420 stores a computer program executable by the processor 410, and when the computer program is executed by the processor 410, the above method is implemented.

An embodiment of the application further provides a storage medium 430 on which a computer program is stored, and the computer program, when executed by the processor 410, implements the method as described above.

The storage medium 430 may be realized by any type of volatile or nonvolatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

In the description of the invention, the terms "first" and "second" are only used for descriptive purposes, and cannot be understood as indicating or implying relative importance or implicitly indicating the number of indicated technical features. Therefore, the features defined with "first" and "second" may include one or more of the features explicitly or implicitly. "Multiple" means two or more, unless otherwise specifically defined.

In the present invention, unless otherwise specified and defined, the terms "mount", "connect" and "fix" should be understood in a broad sense. For example, it can be fixed connection, detachable connection or integrated connection; it can be mechanical connection or electric connection; and it can be direct connection, indirect connection through intermediate media or internal communication or interaction of two elements. For those of ordinary skill in the art, the specific meaning of the terms mentioned above in the present invention should be construed to specific circumstances.

In the description of this specification, terms such as "an embodiment", "some embodiments", "example", "specific example" or "some examples" indicate that the specific features, structures, materials, or characteristics described in conjunction with that embodiment or example are included in at least one embodiment or example of the invention. In this specification, the indicative statements regarding the above-mentioned terms do not necessarily refer to the same embodiment or example. Moreover, the specific features, structures, materials, or characteristics described can be combined in a suitable manner in any one or more embodiments or examples. In addition, those skilled in the art can integrate and combine different embodiments or examples and features of different embodiments or examples described in this specification without contradicting each other.

Any process or method description in the flowchart or otherwise described herein can be understood as representing a module, segment or part of code that includes one or more executable instructions for implementing specific logical functions or steps of the process, and the scope of preferred embodiments of the present invention includes other implementations, in which functions can be performed out of the order shown or discussed, including in a substantially simultaneous manner or in the reverse order according to the functions involved, which should be understood by those skilled in the technical field to which embodiments of the present invention belong.

The logic and/or steps represented in the flowchart or described in other ways herein, for example, can be regarded as a sequenced list of executable instructions for realizing logical functions, and can be embodied in any computer-readable medium for use by or in combination with an instruction execution system, apparatus or device (such as a computer-based system, a system including a processor or other systems that can fetch instructions from and execute instructions from the instruction execution system, apparatus or device). For the purposes of this specification, a "computer-readable medium" can be any apparatus that can contain, store, communicate, propagate or transmit a program for use by or in connection with an instruction execution system, apparatus or device. More specific examples (non-exhaustive list) of computer-readable media include the following: an electrical connection part (electronic apparatus) with one or more wires, a portable computer disk box (magnetic apparatus), a random access memory (RAM), a read-only memory (ROM), an erasable and editable read-only memory (EPROM or flash memory), an optical fiber apparatus, and a portable CD-ROM. In addition, the computer-readable medium may even be paper or other suitable medium on which the program can be printed, because the program can be obtained electronically by, for example, optically scanning the paper or other medium, followed by editing, interpreting or processing in other suitable ways if necessary, and then stored in a computer memory.

It should be understood that various parts of the present invention can be implemented in hardware, software, firmware or a combination thereof. In the above embodiments, a plurality of steps or methods can be realized by software or firmware stored in a memory and executed by an appropriate instruction execution system. For example, if it is implemented in hardware, as in another embodiment, it can be implemented by any one of the following technologies or their combination: a discrete logic circuit with a logic gate for implementing a logic function on a data signal, an application specific integrated circuit with a suitable combinational logic gate, a programmable gate array (PGA), a field programmable gate array (FPGA), and the like.

Those skilled in the art can understand that all or part of the steps carried by the method of the above embodiment can be completed by instructing related hardware through a program, which can be stored in a computer-readable storage medium, and the program, when executed, includes one or a combination of the steps of the method embodiment.

The storage medium mentioned above can be read-only memory, magnetic disk or optical disk, etc. Although the embodiments of the present invention have been shown and described above, it can be understood that the above embodiments are exemplary and cannot be understood as limitations of the present invention, and those skilled in the art can make changes, modifications, substitutions and variations to the above embodiments within the scope of the present invention.

The invention claimed is:

1. A control method of a smart battery swapping station compatible with multiple battery packs, comprising the following steps:

acquiring vehicle information of a vehicle requiring battery swapping, and retrieving a model type of a corresponding battery pack locking and unlocking hole and specific parameters from a database;

when the vehicle arrives at a battery swapping operation platform, capturing an image of a vehicle chassis to determine an initial pose of the vehicle chassis;

processing the initial pose to extract center coordinates of the locking and unlocking hole and a normal vector direction of the locking and unlocking hole;

comparing the center coordinates of the locking and unlocking hole and the normal vector direction of the locking and unlocking hole with the retrieved model type of battery pack locking and unlocking hole and specific parameters in the database to determine if the information is consistent;

if inconsistent, prompting a user to leave the battery swapping operation platform; if consistent, selecting, by a battery swapping automated guided vehicle (AGV), a corresponding locking and unlocking operation method, and retrieving a battery from a storage for battery replacement; and once the battery swapping is complete, generating a battery swapping report and allowing the user to leave, wherein selecting, by a battery swapping AGV, a corresponding locking and unlocking operation method, and retrieving a battery from a storage for battery replacement comprises:

implementing space relocation design to allow the battery swapping AGV to switch between different locking and unlocking methods;

utilizing a height switching mechanism to automatically adjust the height of a locking and unlocking mechanism based on height differences of battery packs for different vehicle models; and during the locking and unlocking process, making fine adjustments through adaptive floating based on changes in the position of the battery pack, wherein selecting, by a battery swapping AGV, a corresponding locking and unlocking operation method, and retrieving a battery from a storage for battery replacement further comprises:

performing battery replacement through a dual AGV coordinated control method, specifically comprising:

connecting independently controlled battery swapping AGVs within the battery swapping station via a communication protocol;

performing time synchronization on the battery swapping AGVs: using the network time protocol (NTP) to ensure consistent timestamps across all AGVs and station control systems;

performing task planning based on task requirements, the current status of the AGVs, the order of vehicle arrivals, and the type of battery pack, and dynamically assigning tasks to each AGV; and utilizing a scheduling algorithm to designate one AGV for disassembly and another AGV for assembly for the vehicle requiring battery swapping, wherein performing battery replacement through a dual AGV coordinated control method further comprises:

autonomous fault monitoring and fault-tolerant control: when one AGV fails, the other AGV switches to a standalone mode to continue the battery swapping task and sends fault information, and wherein performing battery replacement through a dual AGV coordinated control method further comprises:

using a Leader-Follower strategy to allow the two AGVs to maintain spacing and angular deviation within a set range, using a distance sensor and an angle sensor to monitor and adjust the spacing in real time and continuously detect the relative distance between the two AGVs, and employing a spacing control algorithm to ensure that the two AGVs maintain a safe distance while traveling on a single track.

2. The control method of a smart battery swapping station compatible with multiple battery packs according to claim 1, wherein acquiring vehicle information of a vehicle requiring battery swapping comprises:

setting up a camera at an entrance of the battery swapping station to capture images of vehicles entering the battery swapping station;

performing size adjustment and color space conversion on the images;

using the Canny edge detection algorithm to extract vehicle contours, employing the Hough transform method to detect geometric shapes within the vehicle contours, and acquiring point cloud data of the vehicle;

utilizing the Euclidean clustering algorithm to group different objects in the point cloud data, extracting key feature points of the vehicle contours from the clustered point cloud, and merging image features with point cloud features to form a complete feature vector; and loading a pre-trained deep learning model, inputting the feature vector into the deep learning model, and outputting a classification result of the vehicle.

3. The control method of a smart battery swapping station compatible with multiple battery packs according to claim 1, wherein capturing an image of a vehicle chassis to determine an initial pose of the vehicle chassis comprises:

capturing a raw image of the vehicle chassis using a visual sensor, and cropping and resizing the captured raw image to a specified dimension;

utilizing a deep learning model for feature extraction, the deep learning model downsampling the input image, predicting a position of a center of a target bounding box and an offset thereof, and generating a feature map;

based on the feature map, predicting the position of the center of the target bounding box, the offset thereof, as well as the width and height of the target bounding box;

acquiring intrinsic and extrinsic parameters of a camera, converting predicted keypoint positions in the feature map to spatial coordinates of the raw image through warp Affine transformation, and generating point cloud data of the vehicle chassis based on a three-dimensional space reconstruction result;

applying voxel filtering to the point cloud data to remove noise points;

performing Euclidean clustering on the filtered point cloud, and using principal component analysis (PCA) to analyze the point cloud data to identify a primary direction of the point cloud data and estimate an approximate orientation of the vehicle chassis;

using the random sample consensus (RANSAC) algorithm to fit the point cloud data to exclude outliers, and obtaining a planar model of the vehicle chassis; and determining the initial pose of the vehicle chassis based on PCA analysis and RANSAC fitting results.

4. The control method of a smart battery swapping station compatible with multiple battery packs according to claim 1, wherein processing the initial pose to extract center coordinates of the locking and unlocking hole and a normal vector direction of the locking and unlocking hole comprises:
performing denoising and contrast enhancement preprocessing on the initial pose, and converting an original RGB image to an HSV (hue, saturation, value) color space;
setting thresholds in the HSV color space for segmentation, and using the Canny edge detection algorithm to identify edges in the image;
applying morphological opening and closing operations to remove small interference spots or connect broken edges, using the Hough circle transform to detect circular contours in the image, and initially locating the locking and unlocking hole;
setting detection parameters to obtain the center coordinates and radius of each detected circle, and fitting a planar model using the least squares method for each initially located locking and unlocking hole;
selecting a region around a center of the initially located locking and unlocking hole as the region of interest (ROI) within the planar model, using the least squares method to fit a plane equation of a point set within the region, and adjusting a position of the center based on a plane fitting result;
extracting a normal vector from the plane equation obtained from the least squares plane fitting, and confirming whether the normal vector direction correctly points toward an opening direction of the locking and unlocking hole; and
outputting the finally determined center coordinates and normal vector direction of the locking and unlocking hole.

5. The control method of a smart battery swapping station compatible with multiple battery packs according to claim 1, further comprising an ordered battery pack charging control method, comprising the following steps:
ordered charging strategy: based on the improved cuckoo search algorithm (CSA), exploring the solution space by considering the state of charge (SOC) of a battery, the health status of a battery, and the scheduled usage time of a vehicle by means of random walks and optimal solution selection, so as to automatically prioritize battery charging;
load prediction and smoothing strategy: continuously collecting real-time data of each battery in the battery swapping station, utilizing a combined prediction model based on a freshness function derived from historical data and cross-entropy, receiving real-time load data of a power grid, and pre-planning the allocation of charging power in conjunction with the load prediction; and
optimal battery pack scheduling strategy: based on the First-In-First-Out (FIFO) principle, ensuring that the batteries arriving in a warehouse first are the first to be utilized.

6. The control method of a smart battery swapping station compatible with multiple battery packs according to claim 5, wherein the ordered charging strategy further comprises:
monitoring grid conditions and charging progress in real time, and when abnormal increases in grid load are detected, adjusting a charging plan by reducing charging power until the grid load returns to normal; and
receiving real-time electricity price information from the power grid, increasing the charging power when low electricity prices are detected, and reducing or stopping charging during peak price periods;
wherein the load prediction and smoothing strategy further comprises:
utilizing a combined prediction model based on a freshness function derived from historical data and cross-entropy to analyze the impact of past charging patterns, weather conditions, and holiday effects on charging demands;
using grey relational analysis to identify historical days with similar meteorological conditions and day types to a target prediction day as the benchmark for prediction, and dynamically adjusting the weights of a single prediction model based on the cross-entropy algorithm;
integrating results from prediction methods such as time series analysis and machine learning models to form a final prediction; and
employing the particle swarm algorithm to calculate a charging plan for the next day; and
wherein the optimal battery pack scheduling strategy further comprises:
collecting key parameters such as battery voltage, current, temperature, and SOC in real time to assess the health status of the battery;
utilizing big data analysis and machine learning techniques to predict trends in battery lifespan;
setting thresholds for battery health status, and if the monitored battery status falls below the thresholds, immediately removing the battery from the battery swapping service for inspection or repair; and
maintaining a reserve of fully charged backup batteries above a specified quantity, and ensuring balanced usage of all batteries to prevent any single battery from being overcharged or excessively discharged.

7. A smart battery swapping station compatible with multiple battery packs, comprising:
a station control system, smart battery swapping equipment, and a smart battery management warehouse, all communicatively connected; wherein the smart battery swapping equipment comprises a plurality of AGVs equipped with a plurality of locking and unlocking modules corresponding to different vehicle types and battery pack locking mechanisms;
the smart battery management warehouse stores a plurality of batteries and charges the same; and
the station control system is used for acquiring vehicle information of a vehicle requiring battery swapping, and retrieving a model type of a corresponding battery pack locking and unlocking hole and specific parameters from a database; when the vehicle arrives at a battery swapping operation platform, capturing an image of a vehicle chassis to determine an initial pose of the vehicle chassis; processing the initial pose to extract center coordinates of the locking and unlocking hole and a normal vector direction of the locking and unlocking hole; comparing the center coordinates of the locking and unlocking hole and the normal vector direction of the locking and unlocking hole with the retrieved model type of battery pack locking and unlocking hole and specific parameters in the database to determine if the information is consistent; if inconsistent, prompting a user to leave the battery swapping operation platform;

if consistent, controlling, by the smart battery swapping equipment, the battery swapping AGVs to select a corresponding locking and unlocking operation method, and retrieving a battery from the smart battery management warehouse for battery replacement; and once the battery swapping is complete, generating a battery swapping report and allowing the user to leave, wherein the AGV also comprises Mecanum wheels, a servo motor, a vision system, laser radar, and a sensor; and the smart battery swapping station further comprises:

a space relocation mechanism which allows the AGV to switch between different locking and unlocking methods;

a height switching mechanism which automatically adjusts the height of a locking and unlocking mechanism based on height differences of battery packs for different vehicle models; and an adaptive floating mechanism which, during the locking and unlocking process, makes fine adjustments through adaptive floating based on changes in the position of the battery pack, wherein the station control system further comprises an AGV control unit which is used for:
  connecting independently controlled battery swapping AGVs within the battery swapping station via a communication protocol;
  performing time synchronization on the battery swapping AGVs: using the NTP to ensure consistent timestamps across all AGVs and station control systems;
  performing task planning based on task requirements, the current status of the AGVs, the order of vehicle arrivals, and the type of battery pack, and dynamically assigning tasks to each AGV; and
  utilizing a scheduling algorithm to designate one AGV for disassembly and another AGV for assembly for the vehicle requiring battery swapping, and wherein the station control system further comprises a fault handling unit which is used for:
  when one AGV fails, allowing the other AGV to switch to a standalone mode to continue the battery swapping task and send fault information; and wherein the station control system further comprises a distance control unit which is used for:
  using a Leader-Follower strategy to allow the two AGVs to maintain spacing and angular deviation within a set range, using a distance sensor and an angle sensor to monitor and adjust the spacing in real time and continuously detect the relative distance between the two AGVs, and employing a spacing control algorithm to ensure that the two AGVs maintain a safe distance while traveling on a single track.

8. The smart battery swapping station compatible with multiple battery packs according to claim 7, wherein the station control system comprises:

a technical architecture which allows the station control system to communicate in real time with the smart battery swapping equipment, the smart battery management warehouse, and other equipment and systems within the battery swapping station, perceives the entire process of battery swapping and monitors the environmental information within the battery swapping station, providing battery swapping monitoring data to a battery swapping station operation system and government management platforms;

a network architecture which employs the TCP/IP network protocol to support the access and acquisition of diverse devices, the station control system using MySQL for data storage and processing and being equipped with SQL query algorithms; and a business architecture which ensures the smooth flow of automated battery swapping through battery swapping monitoring, maintains the stability of the environment and facilities within the station with auxiliary equipment monitoring, prevents and responds to potential risks through safety management, provides decision-making support through operational analysis, coordinates equipment and user data through system management, and facilitates seamless integration with external platforms through service management.

9. The smart battery swapping station compatible with multiple battery packs according to claim 7, wherein the smart battery swapping equipment further comprises:

a flexible battery swapping operation platform designed to automatically adjust vehicle positions, provide a designated operational area for electric vehicle parking, accommodate various types of vehicles with different track widths and wheelbases, and automatically locate the vehicles.

10. The smart battery swapping station compatible with multiple battery packs according to claim 7, wherein the smart battery management warehouse comprises:

a dynamic charging scheduling unit which employs machine learning algorithms to predict battery demands and grid loads and dynamically adjust a charging plan;

a battery life optimization unit which selects the most suitable charging rate based on the battery type and current status, preventing overcharging or excessive discharging to extend battery life, and formulates a regular maintenance plan based on data analysis to ensure the long-term health of the battery packs; and a flexible storage and scheduling unit which works in conjunction with the battery swapping AGVs to enable automated storage and retrieval of the battery packs, and automatically allocates the battery packs to charging stations or storage areas based on the battery status and charging demands; and wherein the smart battery management warehouse further comprises:

an ordered charging unit which, based on the improved CSA, explores the solution space by considering the SOC of a battery, the health status of a battery, and the scheduled usage time of a vehicle by means of random walks and optimal solution selection, so as to automatically prioritize battery charging;

a load prediction and smoothing unit which continuously collects real-time data of each battery in the battery swapping station, utilizes a combined prediction model based on a freshness function derived from historical data and cross-entropy, receives real-time load data of a power grid, and pre-plans the allocation of charging power in conjunction with the load prediction; and an optimal battery pack scheduling unit which, based on the FIFO principle, ensures that the batteries arriving in a warehouse first are the first to be utilized.

11. The smart battery swapping station compatible with multiple battery packs according to claim 10,
wherein the ordered charging unit is further used for:
monitoring grid conditions and charging progress in real time, and when abnormal increases in grid load are detected, adjusting a charging plan by reducing charging power until the grid load returns to normal; and
receiving real-time electricity price information from the power grid, increasing the charging power when low electricity prices are detected, and reducing or stopping charging during peak price periods;
wherein the load prediction and smoothing unit is further used for:
utilizing a combined prediction model based on a freshness function derived from historical data and cross-entropy to analyze the impact of past charging patterns, weather conditions, and holiday effects on charging demands;
using grey relational analysis to identify historical days with similar meteorological conditions and day types to a target prediction day as the benchmark for prediction, and dynamically adjusting the weights of a single prediction model based on the cross-entropy algorithm;
integrating results from prediction methods such as time series analysis and machine learning models to form a final prediction; and
employing the particle swarm algorithm to calculate a charging plan for the next day; and
wherein the optimal battery pack scheduling unit is further used for:
collecting key parameters such as battery voltage, current, temperature, and SOC in real time to assess the health status of the battery;
utilizing big data analysis and machine learning techniques to predict trends in battery lifespan;
setting thresholds for battery health status, and if the monitored battery status falls below the thresholds, immediately removing the battery from the battery swapping service for inspection or repair; and
maintaining a reserve of fully charged backup batteries above a specified quantity, and ensuring balanced usage of all batteries to prevent any single battery from being overcharged or excessively discharged.

12. The smart battery swapping station compatible with multiple battery packs according to claim 7,
wherein the station control system further comprises a vehicle information identification unit which is used for:
setting up a camera at an entrance of the battery swapping station to capture images of vehicles entering the battery swapping station;
performing size adjustment and color space conversion on the images;
using the Canny edge detection algorithm to extract vehicle contours, employing the Hough transform method to detect geometric shapes within the vehicle contours, and acquiring point cloud data of the vehicle;
utilizing the Euclidean clustering algorithm to group different objects in the point cloud data, extracting key feature points of the vehicle contours from the clustered point cloud, and merging image features with point cloud features to form a complete feature vector; and
loading a pre-trained deep learning model, inputting the feature vector into the deep learning model, and outputting a classification result of the vehicle;
wherein the station control system further comprises an initial pose identification unit which is used for:
capturing a raw image of the vehicle chassis using a visual sensor, and cropping and resizing the captured raw image to a specified dimension;
utilizing a deep learning model for feature extraction, the deep learning model downsampling the input image, predicting a position of a center of a target bounding box and an offset thereof, and generating a feature map;
based on the feature map, predicting the position of the center of the target bounding box, the offset thereof, as well as the width and height of the target bounding box;
acquiring intrinsic and extrinsic parameters of a camera, converting predicted keypoint positions in the feature map to spatial coordinates of the raw image through warpAffine transformation, and generating point cloud data of the vehicle chassis based on a three-dimensional space reconstruction result;
applying voxel filtering to the point cloud data to remove noise points;
performing Euclidean clustering on the filtered point cloud, and using PCA to analyze the point cloud data to identify a primary direction of the point cloud data and estimate an approximate orientation of the vehicle chassis;
using the RANSAC algorithm to fit the point cloud data to exclude outliers, and obtaining a planar model of the vehicle chassis; and
determining the initial pose of the vehicle chassis based on PCA analysis and RANSAC fitting results; and
wherein the station control system further comprises a locking and unlocking hole identification unit which is used for:
performing denoising and contrast enhancement preprocessing on the initial pose, and converting an original RGB image to an HSV color space;
setting thresholds in the HSV color space for segmentation, and using the Canny edge detection algorithm to identify edges in the image;
applying morphological opening and closing operations to remove small interference spots or connect broken edges, using the Hough circle transform to detect circular contours in the image, and initially locating the locking and unlocking hole;
setting detection parameters to obtain the center coordinates and radius of each detected circle, and fitting a planar model using the least squares method for each initially located locking and unlocking hole;
selecting a region around a center of the initially located locking and unlocking hole as the ROI within the planar model, using the least squares method to fit a plane equation of a point set within the region, and adjusting a position of the center based on a plane fitting result;
extracting a normal vector from the plane equation obtained from the least squares plane fitting, and confirming whether the normal vector direction correctly points toward an opening direction of the locking and unlocking hole; and
outputting the finally determined center coordinates and normal vector direction of the locking and unlocking hole.

13. The smart battery swapping station compatible with multiple battery packs according to claim 7, wherein the AGV further comprises a mode switching unit which is used for:
   automatically or manually switching the disassembly mode, transfer mode, and assembly mode of the AGV based on the different stages of the battery swapping task.

* * * * *